United States Patent
Koizumi

(10) Patent No.: US 10,783,355 B2
(45) Date of Patent: Sep. 22, 2020

(54) IMAGE PROCESSING SYSTEM, IMAGE PROCESSING METHOD, PROGRAM, AND RECORDING MEDIUM

(71) Applicant: FUJIFILM Corporation, Tokyo (JP)

(72) Inventor: Isao Koizumi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 135 days.

(21) Appl. No.: 16/121,739

(22) Filed: Sep. 5, 2018

(65) Prior Publication Data

US 2019/0005312 A1 Jan. 3, 2019

Related U.S. Application Data

(63) Continuation of application No. PCT/JP2017/011146, filed on Mar. 21, 2017.

(30) Foreign Application Priority Data

Mar. 29, 2016 (JP) .................................. 2016-065863
Mar. 14, 2017 (JP) .................................. 2017-048410

(51) Int. Cl.
*G06K 9/00* (2006.01)
*H04N 21/266* (2011.01)
(Continued)

(52) U.S. Cl.
CPC ..... *G06K 9/00288* (2013.01); *G06K 9/00926* (2013.01); *G06T 7/74* (2017.01);
(Continued)

(58) Field of Classification Search
USPC ........................................................ 382/115
See application file for complete search history.

(56) References Cited

U.S. PATENT DOCUMENTS 7,813,557 B1* 10/2010 Bourdev ............. G06F 16/5866
382/205
2005/0134946 A1 6/2005 Tsue et al.
(Continued)

FOREIGN PATENT DOCUMENTS

JP 2001-297051 A 10/2001
JP 2005-184790 A 7/2005
(Continued)

OTHER PUBLICATIONS

International Search Report issued in corresponding International Application No. PCT/JP2017/011146; dated May 23, 2017.
(Continued)

*Primary Examiner* — Stephen P Coleman
(74) *Attorney, Agent, or Firm* — Studebaker & Brackett PC

(57) ABSTRACT

In an image processing system, an image processing method, a program, and a recording medium, a person specifying section specifies a plurality of persons appearing in a first composite image owned by a first user. A designated person receiving section receives designation of one or more persons as designated persons among the plurality of persons appearing in the first composite image. An image specifying section specifies images, in which the designated persons appear, from a first image group owned by the first user. A composite image creation unit creates a second composite image using the images in which the designated persons appear.

20 Claims, 30 Drawing Sheets

(51) Int. Cl.
  *G06T 7/73* (2017.01)
  *H04N 1/387* (2006.01)
(52) U.S. Cl.
  CPC .............. *G06T 7/75* (2017.01); *H04N 1/387* (2013.01); *H04N 1/3876* (2013.01); *H04N 21/266* (2013.01)

(56) References Cited

U.S. PATENT DOCUMENTS

| | | | |
|---|---|---|---|
| 2008/0226140 A1 | 9/2008 | Okamura | |
| 2008/0240489 A1* | 10/2008 | Marugame | ................ G06T 1/00 382/100 |
| 2015/0092070 A1 | 4/2015 | Hatano et al. | |

FOREIGN PATENT DOCUMENTS

| | | |
|---|---|---|
| JP | 2007-316939 A | 12/2007 |
| JP | 2008-233957 A | 10/2008 |
| JP | 2008-257308 A | 10/2008 |
| JP | 2015-069431 A | 4/2015 |
| JP | 2015-133000 A | 7/2015 |

OTHER PUBLICATIONS

International Preliminary Report on Patentability issued in corresponding International Application No. PCT/JP2017/011146; dated Oct. 2, 2018.

An Office Action mailed by the Japanese Patent Office dated Jan. 8, 2019, which corresponds to Japanese Patent Application No. 2017-048410 and is related to U.S. Appl. No. 16/121,739.

* cited by examiner

FIG. 22

<     3. CHECK/SAVE CONTENTS

STEP1 > STEP2 > STEP3 > STEP4

2/3    LOG IN AND SAVE INPUT CONTENTS SO FAR.

E-MAIL ADDRESS

PASSWORD

LOGIN

NEW MEMBERSHIP REGISTRATION    PASSWORD FORGOT

FIG. 23

<     3. CHECK/SAVE CONTENTS

STEP1 > STEP2 > STEP3 > STEP4

3/3    LOGIN AND SAVING OF INPUT CONTENTS HAVE BEEN COMPLETED.

E-MAIL OF COMPLETION OF REGISTRATION HAS BEEN SENT TO REGISTERED E-MAIL ADDRESS OF MEMBER ***.
THIS E-MAIL INCLUDES URL FOR ACCESSING MANAGEMENT SCREEN FOR SECRETARY. IN ORDER TO START, PLEASE CLICK THIS URL.
* IF YOU WANT TO SEND E-MAIL OF COMPLETION OF REGISTRATION TO E-MAIL ADDRESS OTHER THAN E-MAIL ADDRESS OF MEMBER ***:
E-MAIL ADDRESS

SEND

NEXT

FIG. 26

| < | 4. CREATE/SEND INVITATION LETTER |
|---|---|

STEP1 STEP2 STEP3 STEP4

3/3  PLEASE SEND INVITATION LETTER AND PASSWORD TO EVERYONE BY SNS OR E-MAIL.

SEND INVITATION LETTER

| SNS | E-MAIL |

INVITATION LETTER URL http://XXXXXXX

PASSWORD

5865

[ NEXT ]

FIG. 27

MESSAGE FROM SECRETARY

LET'S MAKE PHOTOBOOK WITH YOUR PHOTOS AND MESSAGES!

HOPEFULLY

* PROVIDE PHOTOS TO BE USED IN PHOTOBOOK

* WRITE MESSAGE FOR PHOTOBOOK

PLEASE SEND BY DECEMBER 2 (WEDNESDAY), 23:59, BECAUSE I WANT TO RECEIVE FINISHED GOODS BY DECEMBER 20.

TERMS OF USE
○ AGREE TO TERMS OF USE

NEXT

| IMAGES TO BE USED |
|---|
| PLEASE DESIGNATE IMAGES TO BE USED FOR REPLY POSTCARD.<br><br>☐ FOLDER [ DESIGNATE ]<br><br>☐ IMAGING DATE<br>FROM [ ] YEAR [ ] MON [ ] DAY<br>TO [ ] YEAR [ ] MON [ ] DAY<br><br>☐ IMAGING LOCATION<br>[ DESIGNATE ] AROUND |
| NEXT |

FIG. 41

| CREATE AUTO SELECT |
|---|
| CREATE POSTCARD BY AUTOMATICALLY SELECTING IMAGE SUITABLE FOR PERSON TO WHOM REPLY NEEDS TO BE SENT. |
| CREATE AUTO SELECT |

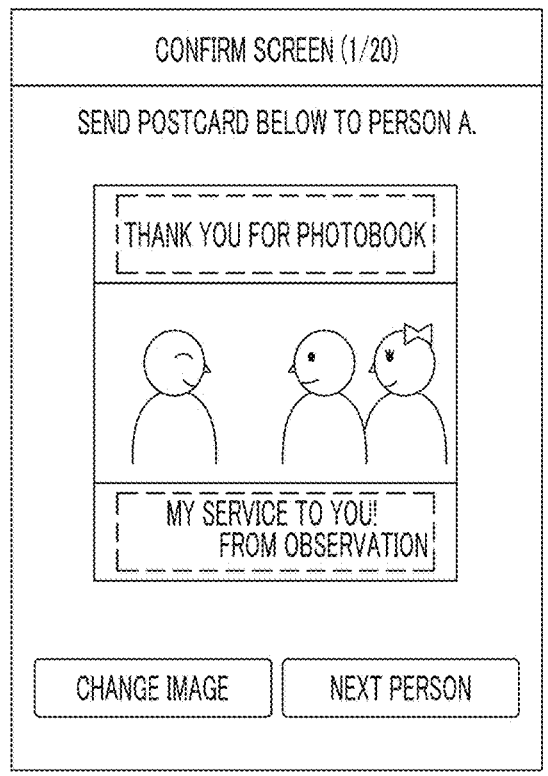

IMAGE PROCESSING SYSTEM, IMAGE PROCESSING METHOD, PROGRAM, AND RECORDING MEDIUM

CROSS-REFERENCE TO RELATED APPLICATIONS

This application is a Continuation of PCT International Application No. PCT/JP2017/011146 filed on Mar. 21, 2017, which claims priority under 35 U.S.C § 119(a) to Japanese Patent Application No. 2016-065863 filed on Mar. 29, 2016 and Japanese Patent Application No. 2017-048410 filed on Mar. 14, 2017. Each of the above application(s) is hereby expressly incorporated by reference, in its entirety, into the present application.

BACKGROUND OF THE INVENTION

1. Field of the Invention

The present invention relates to an image processing system, an image processing method, a program, and a recording medium for creating a composite image, such as a photobook, using a plurality of images acquired from terminal devices of a plurality of users through a network.

2. Description of the Related Art

Conventionally, there is a service of creating a photo collection (photobook) of a layout that a user desires using a plurality of transmitted images (image data) in a case where the user transmits the plurality of images owned by the user to a service provider through the Internet.

For example, a photobook is created by classifying a plurality of images into a plurality of groups based on the imaging time or the like in consideration of the continuity or relevance of images and automatically arranging (automatically laying out) images included in each group on corresponding pages.

In recent years, not only creating one photobook using a plurality of images owned by one user but also creating one photobook using a plurality of images owned by a plurality of users (refer to JP2008-257308A and JP2015-069431A), acquiring messages for writing from a plurality of users and creating a writing using the messages for writing acquired from the plurality of users (refer to JP2001-297051A and JP2015-133000A), and the like are known.

In practice, there is also a service of creating one photobook using a plurality of images owned by a plurality of users, messages sent by the plurality of users, and the like (refer to "Year Album Simple Creation Of Photobook And Photo Album", [online], Mar. 1, 2016, Fujifilm, [Search on Mar. 10, 2016], the Internet <URL:http://year-album.jp/>, "Create Photobook For Writing With Year Album That Everyone Makes!|Fujifilm", [online], Mar. 1, 2016, Fujifilm, [Search on Mar. 10, 2016], the Internet <URL:http://year-album.jp/minna/>, and "How To Make: Create Photobook For Writing With Year Album That Everyone Makes!|Fujifilm", [online], Mar. 1, 2016, Fujifilm, [Search on Mar. 10, 2016], the Internet <URL:http://year-album.jp/minna/login/>).

SUMMARY OF THE INVENTION

For example, in the case of creating a photobook using a plurality of images captured by a plurality of users in a wedding reception, a photobook with the bride and groom as the main character is created and sent to the bride and groom. In this case, in return for receiving the photobook, the bride and groom, who is the recipient of the photobook, desires to create a composite image using images in which each person participating in the wedding reception appears, among a plurality of images owned by the bride and groom, and send the created composite image to the person. In particular, in a case where the bride and groom asked a cameraman to take a picture, the bride and groom is considered to have received a large number of images, in which each participating person appears with a good image quality, from the cameraman. In this case, it is not possible for the bride and groom to easily create and send a composite image for each person using a large number of received images in the related art.

It is an object of the present invention to provide an image processing system, an image processing method, a program, and a recording medium capable of creating another composite image using images of persons appearing in a composite image based on the composite image.

In order to achieve the aforementioned object, the present invention provides an image processing system comprising: a first composite image acquisition section that acquires a first composite image owned by a first user; an image analysis section that analyzes contents of the first composite image; a person specifying section that specifies a plurality of persons appearing in the first composite image based on an analysis result of the first composite image; a designated person receiving section that receives designation of one or more persons as designated persons among the plurality of persons appearing in the first composite image; a first image group storage section that stores a first image group owned by the first user; an image specifying section that specifies images in which the designated persons appear from the first image group; and a composite image creation unit that creates a second composite image using the images in which the designated persons appear.

Here, it is preferable that the first composite image has identification information for identifying the first composite image from other images. It is preferable to further comprise: an identification information acquisition section that acquires the identification information included in the first composite image; a face image storage section that, in a case of creating the first composite image, acquires a plurality of face images including face images of a plurality of users from terminal devices of the plurality of users through a network and stores the plurality of acquired face images; and a face image specifying section that specifies the face images of the plurality of users from the plurality of face images stored in the face image storage section based on the identification information acquired by the identification information acquisition section. It is preferable that the person specifying section specifies each of the plurality of users corresponding to the plurality of persons appearing in the first composite image based on the face images of the plurality of users specified by the face image specifying section and that the designated person receiving section specifies users corresponding to the one or more designated persons from the plurality of users specified by the person specifying section.

The present invention provides an image processing system comprising: an identification information acquisition section that acquires identification information for identifying a first composite image owned by a first user from other images; a face image storage section that, in a case of creating the first composite image, acquires a plurality of face images including face images of a plurality of users from terminal devices of the plurality of users through a network and stores the plurality of acquired face images; a face image specifying section that specifies the face images of the plurality of users from the plurality of face images stored in the face image storage section based on the identification information acquired by the identification information acquisition section; a first image group storage section that stores a first image group owned by the first user; a designated person receiving section that receives designation of one or more persons as designated persons among the plurality of users specified by the face image specifying section; an image specifying section that specifies images in which the designated persons appear from the first image group; and a composite image creation unit that creates a second composite image using the images in which the designated persons appear.

It is preferable to further comprise an importance information acquisition section that acquires information of an importance of the designated person set by the first user from a terminal device of the first user through the network. It is preferable that, based on the information of the importance, the composite image creation unit creates the second composite image by preferentially using an image in which a designated person having a high importance appears rather than an image in which a designated person having a low importance appears.

It is preferable to further comprise a comment acquisition section that acquires a comment of the first user on the designated person from a terminal device of the first user. It is preferable that the composite image creation unit creates the second composite image using the comment in addition to the plurality of images in which the designated persons appear.

It is preferable to further comprise a motion picture acquisition section that acquires each of one or more motion pictures, which are associated with a plurality of images used in the second composite image, from a terminal device of the first user. It is preferable that the composite image creation unit creates the second composite image using the first image group which includes one or more images associated with each of the one or more motion pictures and in which the designated persons appear. It is preferable that, in a case where a first image associated with a first motion picture of the one or more motion pictures, in the first image group used in the second composite image, is captured by an image capturing unit of a terminal device of the designated person and the captured first image is displayed on an image display unit of the terminal device of the designated person, the first motion picture is reproduced on the image display unit of the terminal device of the designated person.

It is preferable that the first motion picture is reproduced within a display region of the first image displayed on the image display unit of the terminal device of the designated person.

The present invention provides an image processing method comprising: a step in which a first composite image acquisition section acquires a first composite image owned by a first user; a step in which an image analysis section analyzes contents of the first composite image; a step in which a person specifying section specifies a plurality of persons appearing in the first composite image based on an analysis result of the first composite image; a step in which a designated person receiving section receives designation of one or more persons as designated persons among the plurality of persons appearing in the first composite image; a step in which a first image group storage section stores a first image group owned by the first user; a step in which an image specifying section specifies images in which the designated persons appear from the first image group; and a step in which a composite image creation unit creates a second composite image using the images in which the designated persons appear.

Here, it is preferable that the first composite image has identification information for identifying the first composite image from other images. It is preferable to further comprise: a step in which an identification information acquisition section acquires the identification information included in the first composite image; a step in which, in a case of creating the first composite image, a face image storage section acquires a plurality of face images including face images of a plurality of users from terminal devices of the plurality of users through a network and stores the plurality of acquired face images; and a step in which a face image specifying section specifies the face images of the plurality of users from the plurality of face images stored in the face image storage section based on the identification information acquired by the identification information acquisition section. It is preferable that, in the step of specifying a person, each of the plurality of users corresponding to the plurality of persons appearing in the first composite image is specified based on the face images of the plurality of users specified by the face image specifying section. It is preferable that, in the step of receiving designation of a person, users corresponding to the one or more designated persons are specified from the plurality of users specified in the step of specifying a person.

The present invention provides an image processing method comprising: a step in which an identification information acquisition section acquires identification information for identifying a first composite image owned by a first user from other images; a step in which, in a case of creating the first composite image, a face image storage section acquires a plurality of face images including face images of a plurality of users from terminal devices of the plurality of users through a network and stores the plurality of acquired face images; a step in which a face image specifying section specifies the face images of the plurality of users from the plurality of face images stored in the face image storage section based on the identification information acquired by the identification information acquisition section; a step in which a first image group storage section stores a first image group owned by the first user; a step in which a designated person receiving section receives designation of one or more persons as designated persons among the plurality of users specified by the face image specifying section; a step in which an image specifying section specifies images in which the designated persons appear from the first image group; and a step in which a composite image creation unit creates a second composite image using the images in which the designated persons appear.

In addition, the present invention provides a program causing a computer to execute each step of the image processing method described above.

In addition, the present invention provides a computer-readable recording medium in which a program causing a computer to execute each step of the image processing method described above is recorded.

According to the present invention, a plurality of persons appearing in the first composite image can be specified, designation of one or more persons can be received as designated persons among the plurality of specified persons, images in which the designated persons appear can be specified from the first image group owned by the first user, and the second composite image different from the first composite image can be created using the specified images. Therefore, the first user can easily create the second composite image.

BRIEF DESCRIPTION OF THE DRAWINGS

FIG. 22 is a conceptual diagram of an example showing a screen for inputting account information.

FIG. 23 is a conceptual diagram of an example showing a screen showing that the login of a secretary user and the storage of the information of image product items and the schedule have been completed.

FIG. 26 is a conceptual diagram of an example showing a screen for sending an invitation letter to a terminal device of a participating user.

FIG. 27 is a conceptual diagram of an example showing a screen showing a received invitation letter.

FIG. 28 is a conceptual diagram of an example showing a screen for inputting a common password for accessing a screen onto which participating users uploads images used in a composite image, evaluation information of images, messages for writing, and the like.

FIG. 30 is a conceptual diagram of an example showing a screen for registering a name registered as a participating user and a secret code.

FIG. 31 is a conceptual diagram of an example showing a screen for a participating user to select an image to be uploaded.

FIG. 40 is a conceptual diagram of an example showing a screen for designating a first image group.

FIG. 41 is a conceptual diagram of an example showing a screen for notifying that a postcard is created by automatically selecting images from the first image group.

FIG. 42 is a conceptual diagram of an example showing a screen for checking a second composite image.

FIG. 43 is a conceptual diagram of an example showing a screen for inputting the address of a person to whom a second composite image is to be sent.

DESCRIPTION OF THE PREFERRED EMBODIMENTS

Hereinafter, an image processing system, an image processing method, a program, and a recording medium of the present invention will be described in detail based on a preferred embodiment shown in the accompanying diagrams.

Figure 1:
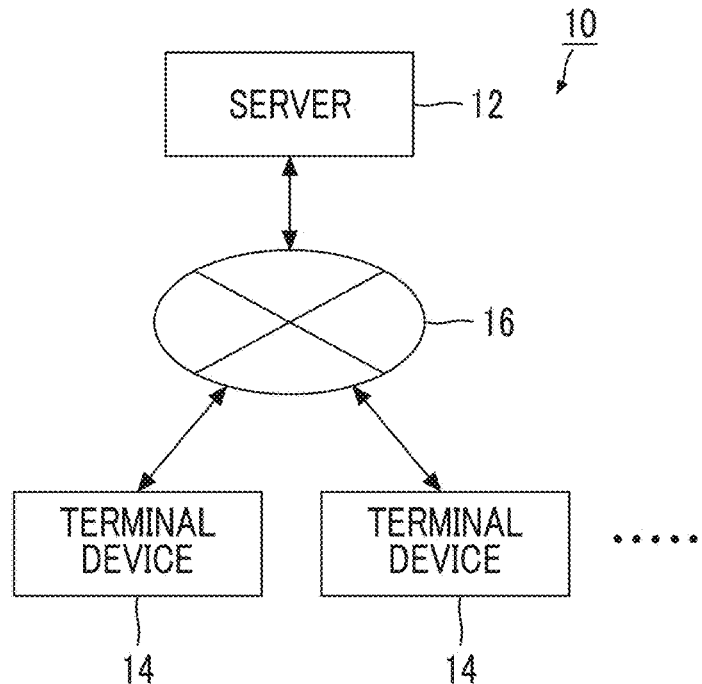
FIG. 1 is a block diagram of an embodiment showing the configuration of an image processing system according to the present invention.

FIG. 1 is a block diagram of an embodiment showing the configuration of an image processing system 10 according to the present invention. The image processing system 10 shown in FIG. 1 creates a composite image, such as a photobook including a writing page, using a plurality of images acquired from terminal devices 14 of a plurality of users involved in the creation of a composite image through a network 16. The image processing system 10 includes a server 12 and terminal devices (clients) 14 of a plurality of users connected to the server 12 through the network 16.

The server 12 performs various kinds of data processing for creating a composite image in response to an instruction from the terminal device 14, and is configured by, for example, a desktop personal computer (PC) or a workstation.

The terminal device 14 gives various instructions to the server 12 to perform various kinds of data processing, and is configured by, for example, a smartphone, a tablet PC, or a notebook PC.

The network 16 is, for example, a telephone line or the Internet circuit, and connects the server 12 and the terminal device 14 to each other by wired or wireless connection to enable bidirectional communication.

Figure 2:
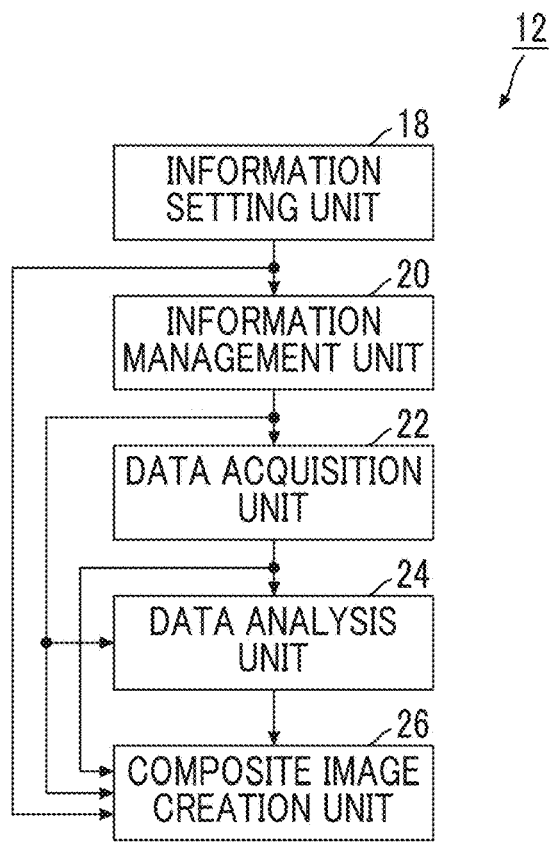
FIG. 2 is a block diagram of an embodiment showing the configuration of a server shown in FIG. 1.

FIG. 2 is a block diagram of an embodiment showing the configuration of the server 12 shown in FIG. 1. The server 12 shown in FIG. 2 includes an information setting unit 18 for setting various kinds of information regarding a composite image, an information management unit 20 for managing various kinds of information regarding the creation of a composite image, a data acquisition unit 22 for acquiring various kinds of data used in a composite image, a data analysis unit 24 for analyzing various kinds of data used in a composite image, and a composite image creation unit 26 for creating a composite image.

In the following description, among a plurality of users involved in the creation of a composite image including a main page and a writing page, one user who creates a composite image is expressed as a secretary user, and two or more users including the secretary user are expressed as participating users. For example, a case where a secretary is one of a group of friends corresponds to this.

However, in another embodiment, in a case where the secretary himself or herself provides neither photos nor messages, such as a case where a photo shop undertakes an agency as a secretary, it is assumed that the number of secretary users does not include the number of participating users.

Figure 3:
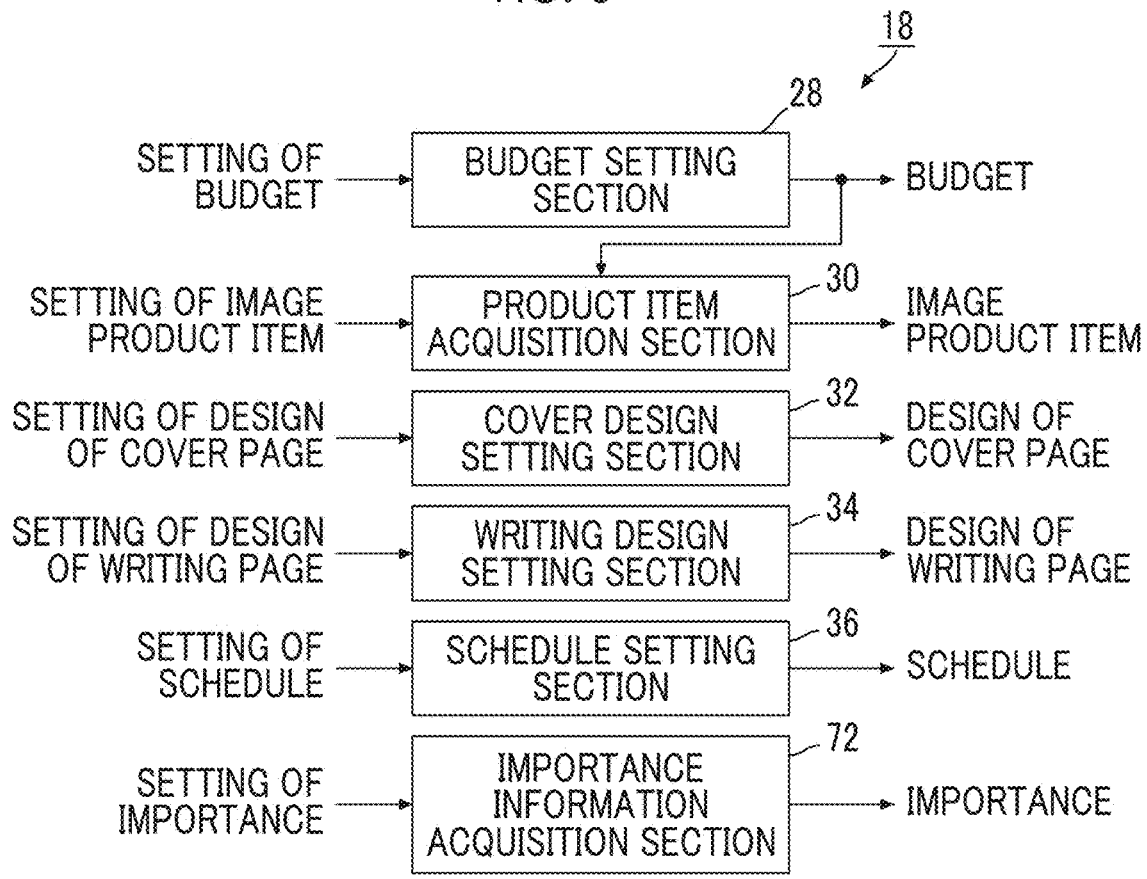
FIG. 3 is a block diagram of an embodiment showing the configuration of an information setting unit shown in FIG. 2.

FIG. 3 is a block diagram of an embodiment showing the configuration of the information setting unit 18 shown in FIG. 2. The information setting unit 18 shown in FIG. 3 includes a budget setting section 28, a product item acquisition section 30, a cover design setting section 32, a writing design setting section 34, a schedule setting section 36, and an importance information acquisition section 72.

The budget setting section 28 acquires information regarding a budget for a composite image, which is set by the secretary user, from the terminal device 14 of the secretary user through the network 16.

Then, the product item acquisition section 30 acquires one image product item set by the secretary user, among one or more image product items (information of image product items) with a size and the number of pages corresponding to the budget information acquired by the budget setting section 28, from the terminal device 14 of the secretary user through the network 16.

The image product item is an item for creating an image product, and includes, for example, a photo album such as a photobook, a shuffle print, a calendar with an image, and the like. Images are mainly photos.

In addition, image product items include a plurality of types of image product items having at least different sizes or different numbers of pages. The number of pages of the image product item is the number of pages including a main page and a writing page. An image product includes an image product of a paper medium and an image product of electronic data.

A page referred to in the present invention means a unit for performing images arrangement and writings arrangement. In the present embodiment, a page refers to a two-page spread page. However, in other embodiments, a page may be a single-sided page. In addition, a two-page spread page may be set as a unit in the image processing system 10 of the present embodiment, and the number of pages of the image product item may be displayed for the user with the single-sided page as a unit.

The photobook is, for example, a composite image obtained by arranging a plurality of images selected by the user on a plurality of pages in a layout that the user desires. In addition, the photobook may be a composite image obtained by arranging images, which are automatically selected from images in a desired period (for example, one year) that are held by the user, on a plurality of pages in an automatic layout (for example, an ear album manufactured by FUJIFILM Co., Ltd.). In addition, the shuffle print is a composite image obtained by arranging a plurality of images on one print by shuffling the plurality of images. The calendar with an image is a composite image obtained by arranging images corresponding to the calendar of each month, for example. The photobook may be a paper medium, or may be electronic data.

In the case of the present embodiment, a composite image is a photobook that includes a writing page at the end of the book. The writing page is a composite image in which messages for writing of two or more participating users acquired from the terminal devices 14 of the participating users are arranged. The message for writing is a message of each participating user used in the writing page.

In addition to the message for writing, a profile image may be placed on the writing page. Although the profile image is, for example, a face image of each participating user, other images may be used.

Then, the cover design setting section 32 acquires information regarding the design of one cover page set by the secretary user, among the designs of one or more cover pages, from the terminal device 14 of the secretary user through the network 16.

The information of the design of the cover page includes, for example, not only design information, such as a cover page pattern and illustrations drawn on the cover page, but also information of the title of a composite image described on the cover page, information of the color of the cover page, and the like.

Then, the writing design setting section 34 acquires information regarding the design of one writing page set by the secretary user, among the designs of one or more writing pages, from the terminal device 14 of the secretary user through the network 16.

The information of the design of the writing page includes, for example, information of a template in which positions, sizes, and the like for arranging the profile image and message for writing of each participating user on the writing page are set in advance.

Then, the schedule setting section 36 acquires schedule information, which includes the deadline for images and messages for writing set by the secretary user, a composite image creation period, and the delivery date of an image product, from the terminal device 14 of the secretary user through the network 16.

The deadline for images and messages for writing indicates a time limit by which each participating user can upload (submit) images and messages for writing, that is, a time limit by which the image processing system 10 can acquire images and messages for writing from the terminal device 14 of the participating user.

In addition, the composite image creation period indicates a period during which the secretary user creates a composite image using a plurality of images acquired from the terminal devices 14 of a plurality of users, in other words, a time limit by which an image product can be ordered. The delivery date of an image product indicates a date to deliver the image product.

Then, the importance information acquisition section 72 acquires, from the terminal device 14 of a recipient (first user of the present invention) of the composite image, information of the importance of a designated person set by the recipient through the network 16.

The designated person is one or more persons designated by the recipient among a plurality of persons appearing in a first composite image owned by the recipient. In the case of the present embodiment, the first composite image is a photobook owned by the recipient. A person other than the recipient may designate one or more persons among a plurality of persons appearing in the first composite image. In the image processing system 10, a second composite image different from the first composite image is created using an image, in which the designated person appears, of the first image group owned by the recipient, and the created second composite image is sent to, for example, the designated person.

The recipient can set the importance of at least one designated person among one or more designated persons. For example, as initial setting, the importance information acquisition section 72 sets the importance of all the designated persons as the importance of the same minimum level. However, the recipient can set the importance by changing the initial setting. The importance of the designated person set by the recipient is set to the importance set by the recipient, and the importance of the designated person that is not set by the recipient is set to the importance of the minimum level that is the initial setting.

The setting of the information of the importance may be performed in advance before the recipient receives the first composite image, or may be performed, for example, based on the analysis result of the first composite image after the recipient receives the first composite image.

Figure 4:
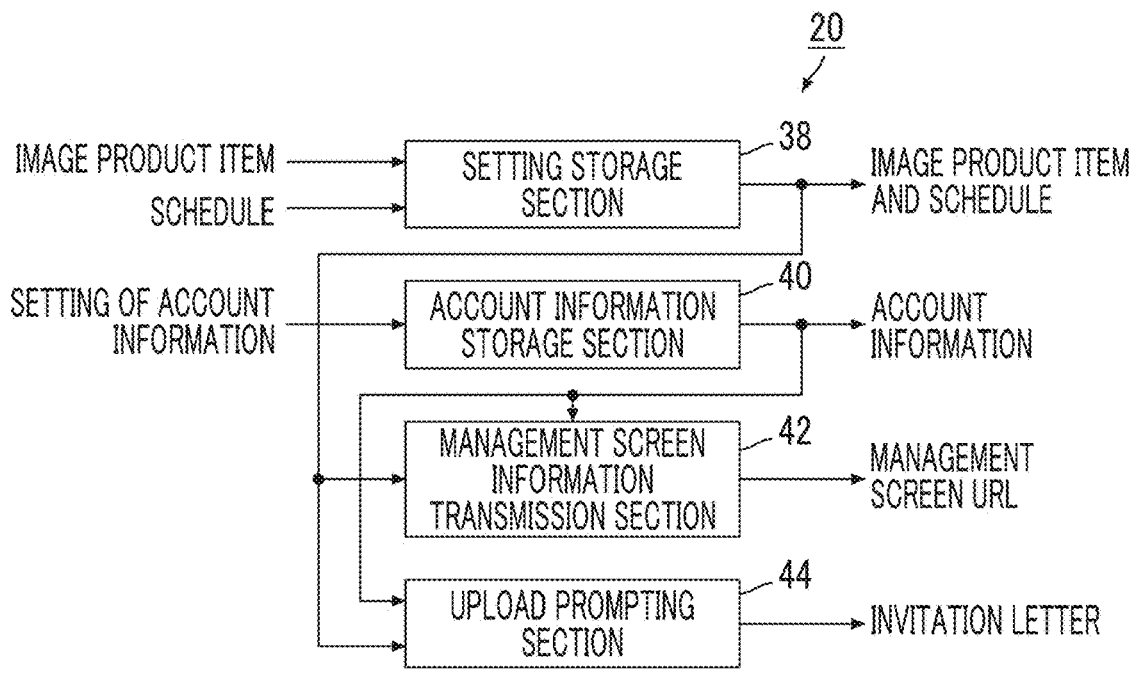
FIG. 4 is a block diagram of an embodiment showing the configuration of an information management unit shown in FIG. 2.

Next, FIG. 4 is a block diagram of an embodiment showing the configuration of the information management unit 20 shown in FIG. 2. The information management unit 20 shown in FIG. 4 includes a setting storage section 38, an account information storage section 40, a management screen information transmission section 42, and an upload prompting section 44.

The setting storage section 38 stores the information of the image product item acquired by the product item acquisition section 30 and the schedule acquired by the schedule setting section 36.

Then, the account information storage section 40 acquires secretary user account information set by the secretary user from the terminal device 14 of the secretary user through the network 16. In addition, the account information storage section 40 acquires participating user account information set by the participating user from the terminal device 14 of the participating user through the network 16, and stores the participating user account information.

Figures 30, 31:
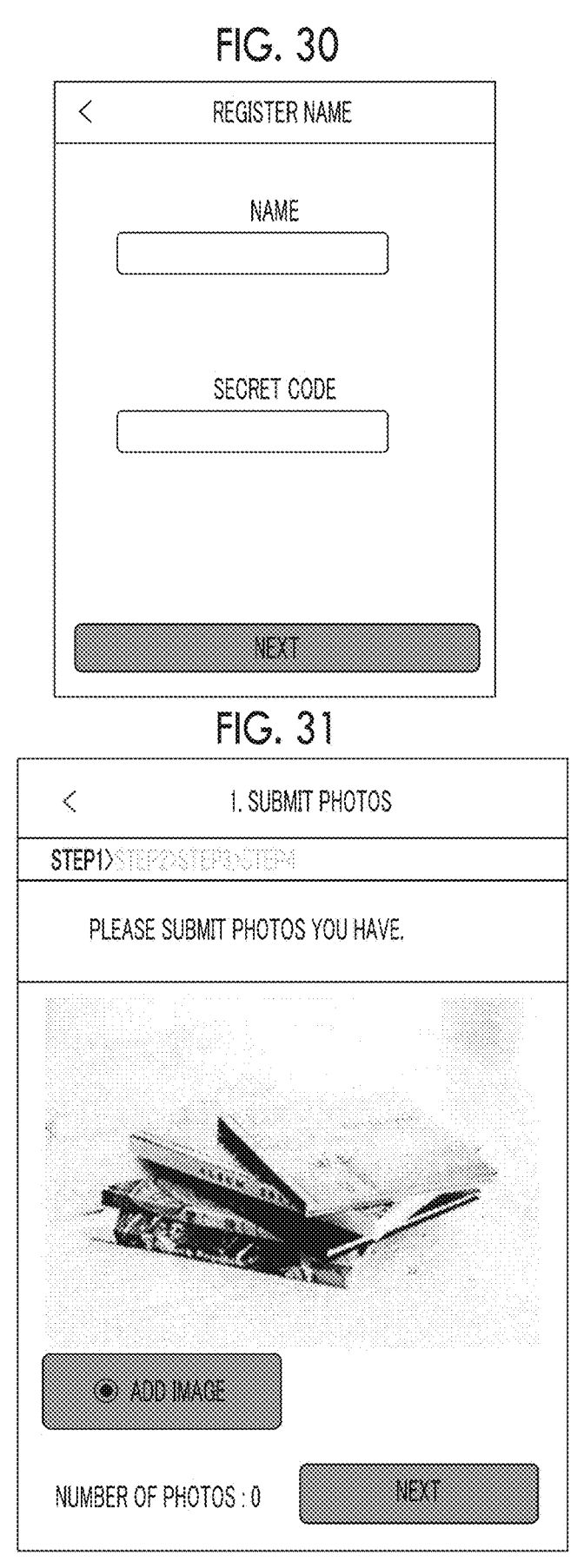

For example, the secretary user account information is the e-mail address of the secretary user and the secretary password. On the other hand, the participating user account information is the name and individual password of the participating user (for the participating user, displayed as a "secret code" as shown in FIG. 30). The name of the participating user is used by the participating user to manage secretary users, and the individual password is used by the image processing system 10 to specify a participating user. In the case of the present embodiment, it is assumed that the secret code cannot be changed and reissued later.

Then, the management screen information transmission section 42 transmits a message, which includes a uniform resource locator (URL) required for the secretary user to access a management screen for managing an image product item, a schedule, and the like, to the terminal device 14 of the secretary user through the network 16. The secretary user can make changes to secretary users, addition of a secretary user (for example, addition of a deputy secretary described later), and the like in addition to changing the image product item and schedule from the management screen.

For example, the management screen information transmission section 42 transmits a message including a URL for accessing the management screen, to the e-mail address of the secretary user acquired by the account information storage section 40, by e-mail.

Then, the upload prompting section 44 sends an invitation letter created by the secretary user to the terminal device 14 of the participating user through the network 16.

The invitation letter is for inviting participating users to create a composite image, and is prompt information to prompt the participating users to upload images to be used in a composite image, evaluation information for each image, a profile image, a message for writing, and the like.

The upload prompting section 44 sends the invitation letter to the terminal device 14 of each participating user through a message of social networking service (SNS) or by e-mail, for example.

Figure 5:
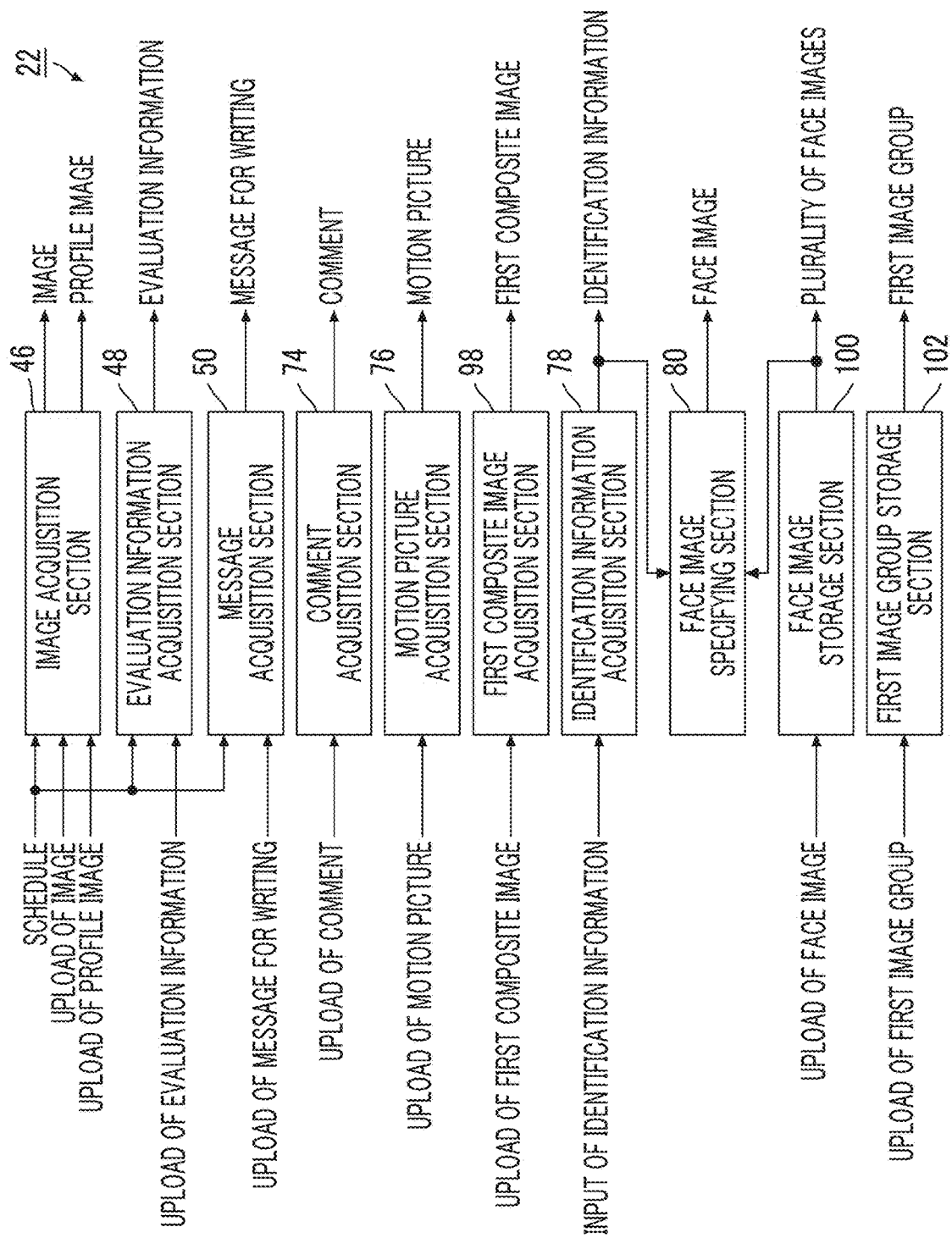
FIG. 5 is a block diagram of an embodiment showing the configuration of a data acquisition unit shown in FIG. 2.

Next, FIG. 5 is a block diagram of an embodiment showing the configuration of the data acquisition unit 22 shown in FIG. 2. The data acquisition unit 22 shown in FIG. 5 includes an image acquisition section 46, an evaluation information acquisition section 48, a message acquisition section 50, a comment acquisition section 74, a motion picture acquisition section 76, a first composite image acquisition section 98, an identification information acquisition section 78, a face image storage section 100, a face image specifying section 80, and a first image group storage section 102.

The image acquisition section 46 acquires a plurality of images (image group) transmitted through the network 16 from the terminal devices 14 of two or more participating users for a predetermined period, in the case of the present embodiment, a period until the deadline for images and messages for writing set by the schedule setting section 36 after the invitation letter is sent. In addition, the image acquisition section 46 acquires the profile image of each participating user set by the participating user.

The image acquisition section 46 acquires a plurality of images (image group) transmitted through the network 16 from the terminal devices 14 of the participating users. Then, the image acquisition section 46 stores the images so as to be associated with information indicating from which participating users the plurality of images have been transmitted. Also for the profile images transmitted through the network 16 from the terminal devices 14 of the participating users, the image acquisition section 46 stores the profile images so as to be associated with information indicating from which participating users the profile images have been transmitted.

Then, the evaluation information acquisition section 48 acquires evaluation information indicating evaluation for each image given by two or more participating users, through the network 16, from the terminal devices 14 of the two or more participating users for the same predetermined period.

The evaluation information of an image is information indicating the evaluation of each participating user for each image, for example, high evaluation or low evaluation.

Then, the message acquisition section 50 acquires the message for writing uploaded by each participating user from the terminal device 14 of each participating user through the network 16 for the same predetermined period.

For the messages for writing transmitted through the network 16 from the terminal devices 14 of the participating users, the message acquisition section 50 stores the messages for writing so as to be associated with information indicating from which participating users the messages for writing have been transmitted.

Then, the comment acquisition section 74 acquires the recipient's comment on the designated person from the terminal device 14 of the recipient through the network 16.

The comment is arranged in the arrangement area of images in combination with images used in the second composite image, for example.

Then, the motion picture acquisition section 76 acquires one or more motion pictures, which are associated with the plurality of images used in the second composite image, from the terminal device 14 of the recipient through the network 16.

Although the contents of the motion picture are not particularly limited, for example, a motion picture in which a designated person appearing, a motion picture having relevance to a designated person, and the like can be used.

Then, the first composite image acquisition section 98 acquires a first composite image owned by the recipient from the terminal device 14 of the recipient through the network 16.

In a case where the first composite image is electronic data (image data of the first composite image), the first composite image acquisition section 98 acquires the electronic data. On the other hand, in a case where the first composite image is carried on an object, such as paper, as in a real photobook, electronic data generated by scanning the first composite image carried on the object with a scanner or the like is acquired.

The first composite image is, for example, a composite image created by the image processing system 10 and sent to the recipient, and has identification information for identifying the first composite image from other images. The identification information is not particularly limited as long as the identification information can uniquely identify each composite image. For example, a barcode, an identification number, and the like described on the composite image can be exemplified.

In the present invention, "a user such as a recipient owns an image" means that the user is in a state in which the user can take the image into the recording medium, analyze the image, and use the image for image combination.

Then, the identification information acquisition section 78 acquires the identification information included in the first composite image acquired by the first composite image acquisition section 98.

Then, in the case of creating the first composite image, the face image storage section 100 acquires a plurality of face images including face images of a plurality of participating users from the terminal devices 14 of the plurality of participating users through the network 16, and stores the plurality of acquired face images.

Then, based on the identification information acquired by the identification information acquisition section 78, the face image specifying section 80 specifies face images of a plurality of participating users relevant to the creation of the first composite image among the plurality of face images stored in the face image storage section 100.

Then, the first image group storage section 102 stores the first image group owned by the recipient, which has been transmitted from the terminal device 14 of the recipient through the network 16.

Figure 6:
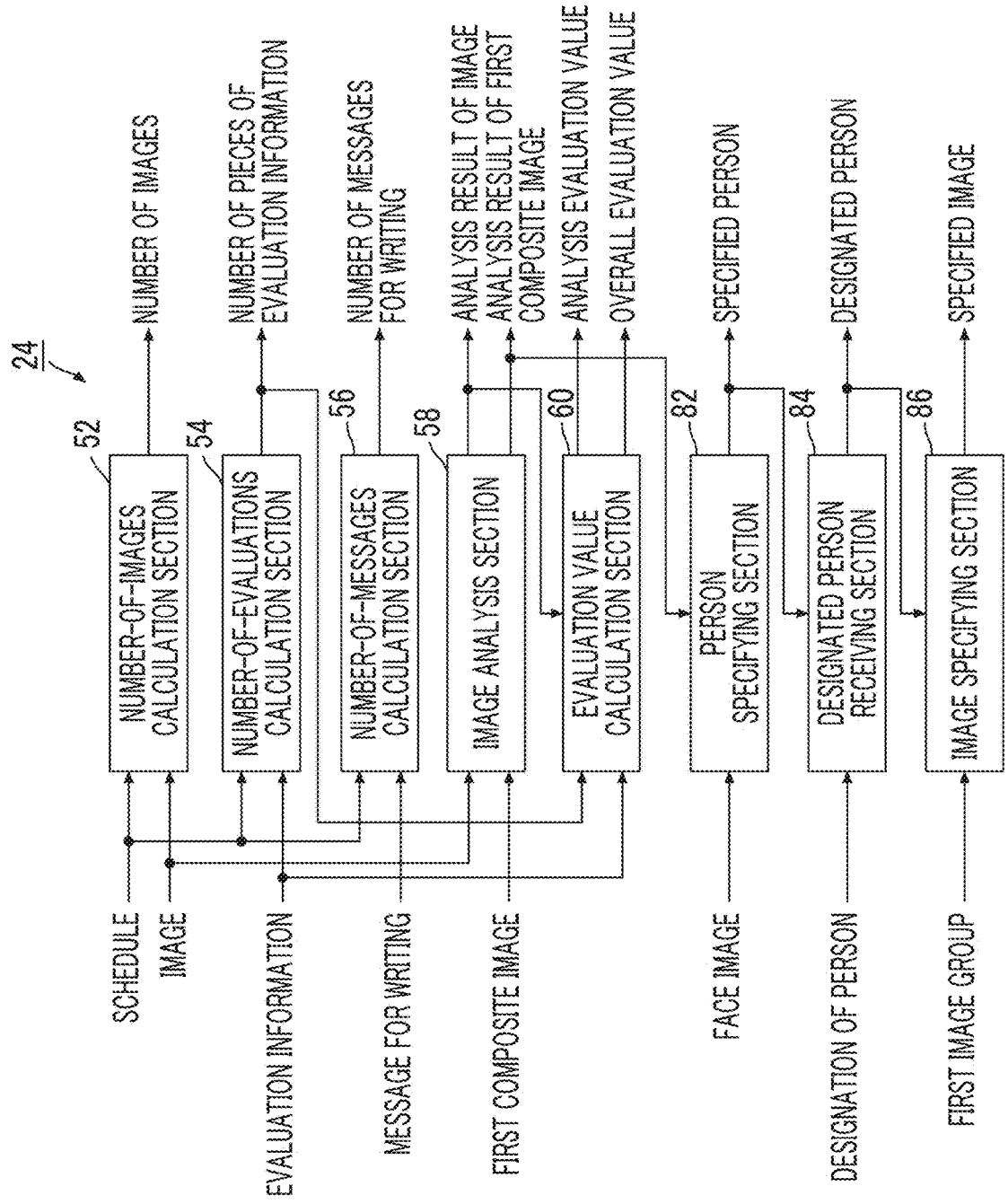
FIG. 6 is a block diagram of an embodiment showing the configuration of a data analysis unit shown in FIG. 2.

Next, FIG. 6 is a block diagram of an embodiment showing the configuration of the data analysis unit 24 shown in FIG. 2. The data analysis unit 24 shown in FIG. 6 includes a number-of-images calculation section 52, a number-of-evaluations calculation section 54, a number-of-messages calculation section 56, an image analysis section 58, an evaluation value calculation section 60, a person specifying section 82, a designated person receiving section 84, and an image specifying section 86.

The number-of-images calculation section 52 calculates the number of images acquired by the image acquisition section 46 after a predetermined period has passed since the invitation letter was sent by the upload prompting section 44, that is, after the deadline for images and messages for writing has passed.

Then, the number-of-evaluations calculation section 54 calculates the number of pieces of evaluation information indicating high evaluation and low evaluation, which have been acquired by the evaluation information acquisition section 48, after the deadline for images and messages for writing has passed.

Then, the number-of-messages calculation section 56 similarly calculates the number of messages for writing acquired by the message acquisition section 50 after the deadline for images and messages for writing has passed.

Then, the image analysis section 58 analyzes the contents of each image acquired by the image acquisition section 46. In the case of the present embodiment, the image analysis section 58 performs image analysis every time an image is acquired by the image acquisition section 46. In addition, the image analysis section 58 analyzes the contents of the first composite image acquired by the first composite image acquisition section 98, that is, the contents of each image used in the first composite image.

For example, the image analysis section 58 analyzes the brightness or hue of an image, the degree of blurring, and the like. In addition, in a case where a person's face is included in the image, the image analysis section 58 analyzes the size of the face, position of the face, direction of the face, skin color of the face, facial expression such as a smiling face, eye line, the number of persons included in the image, positional relationship of persons, and the like.

Then, the evaluation value calculation section 60 calculates the analysis evaluation value of each image based on the analysis result of each image by the image analysis section 58. In addition, based on the evaluation information indicating high evaluation and low evaluation for each image acquired by the evaluation information acquisition section 48, the evaluation value calculation section 60 calculates an overall evaluation value of each image by adding or subtracting a value to or from the analysis evaluation value of each image or by giving a weighting to the analysis evaluation value of each image.

The evaluation value calculation section 60 can calculate an overall evaluation value of each image, for example, by adding a value to the analysis evaluation value of each image based on the number of pieces of evaluation information indicating high evaluation, which has been calculated by the number-of-evaluations calculation section 54, and subtracting a value from the analysis evaluation value of each image based on the number of pieces of evaluation information indicating low evaluation.

Since the analysis evaluation value of each image is calculated based on the analysis result of the image, the analysis evaluation value of the image is a reference for determining whether or not the image is good or poor. Accordingly, it can be said that the higher the analysis evaluation value, the higher the image quality.

Since the overall evaluation value of an image is calculated based not only on the analysis result of the image but also on evaluation information indicating high evaluation and low evaluation that is given by the participating user, the overall evaluation value of the image is a reference for determining the preference of the participating user in addition to the good or bad of the image. Accordingly, it can be said that the higher the overall evaluation value, the higher the image quality or the more favorite image of the participating user.

Then, based on the analysis result of the first composite image by the image analysis section 58, the person specifying section 82 specifies a plurality of persons (specified persons) appearing in the first composite image. In addition, based on the face images of the plurality of participating users specified by the face image specifying section 80, the person specifying section 82 specifies each of a plurality of users corresponding to the plurality of persons appearing in the first composite image.

Then, the designated person receiving section 84 receives, for example, designation of one or more persons designated by the recipient of the first composite image, among the plurality of persons appearing in the first composite image specified by the person specifying section 82, as designated persons. In addition, the designated person receiving section 84 receives designation of one or more persons, among the plurality of participating users relevant to the creation of the first composite image in which the face images have been specified by the face image specifying section 80, as designated persons.

Then, the image specifying section 86 specifies images (specific images), in which the designated persons received by the designated person receiving section 84 appear, from the first image group stored in the first image group storage section 102.

Figure 7:
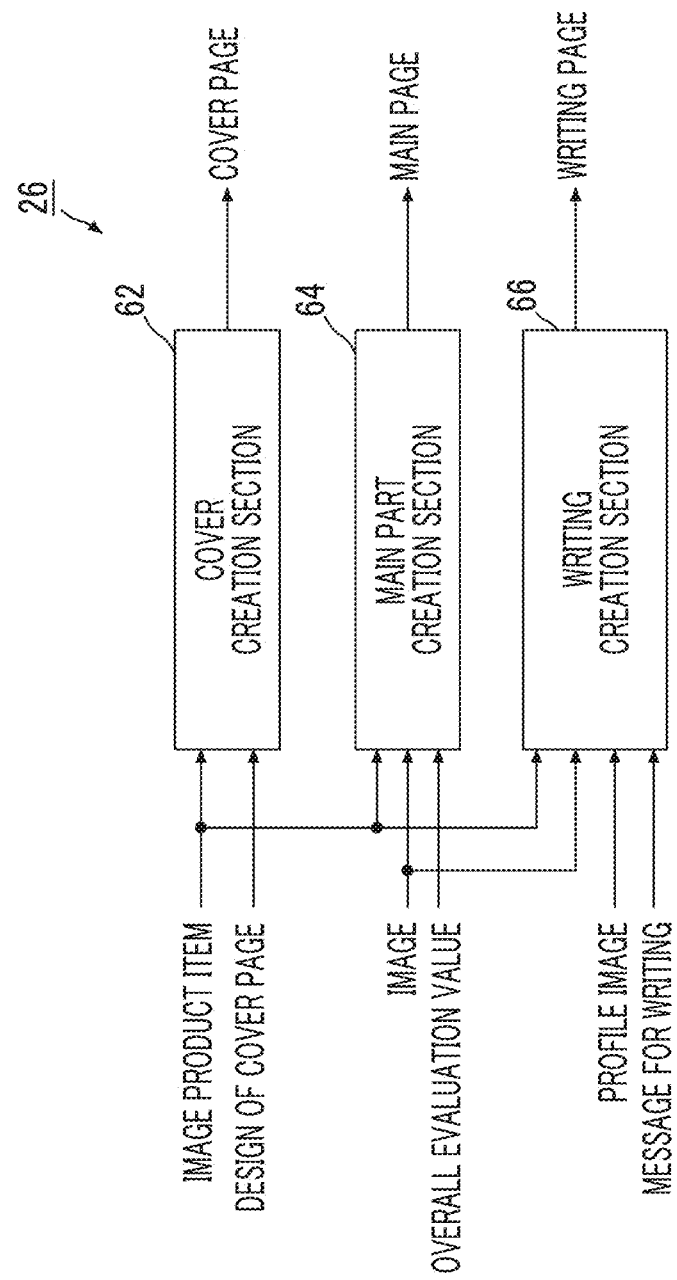
FIG. 7 is a block diagram of an embodiment showing the configuration of a composite image creation unit shown in FIG. 2.

Next, FIG. 7 is a block diagram of an embodiment showing the configuration of the composite image creation unit 26 shown in FIG. 2. The composite image creation unit 26 shown in FIG. 7 includes a cover creation section 62, a main part creation section 64, and a writing creation section 66.

The cover creation section 62 creates a cover page of the design corresponding to the information of the product item stored in the setting storage section 38 and the information of the design of the cover page acquired by the cover design setting section 32.

Then, the main part creation section 64 creates main pages of the number of pages (pages other than the cover page and the writing page) corresponding to the information of the product item stored in the setting storage section 38 using a plurality of images acquired by the image acquisition section 46. The main part creation section 64 creates a composite image corresponding to the information of the product item stored in the setting storage section 38, in the case of the present embodiment, the main page of the photobook.

Creating a composite image refers to creating one image by arranging two or more images. Images to be used in the creation of a composite image include not only photos but also part images, such as a background image, a character image, and a stamp.

Figure 8:
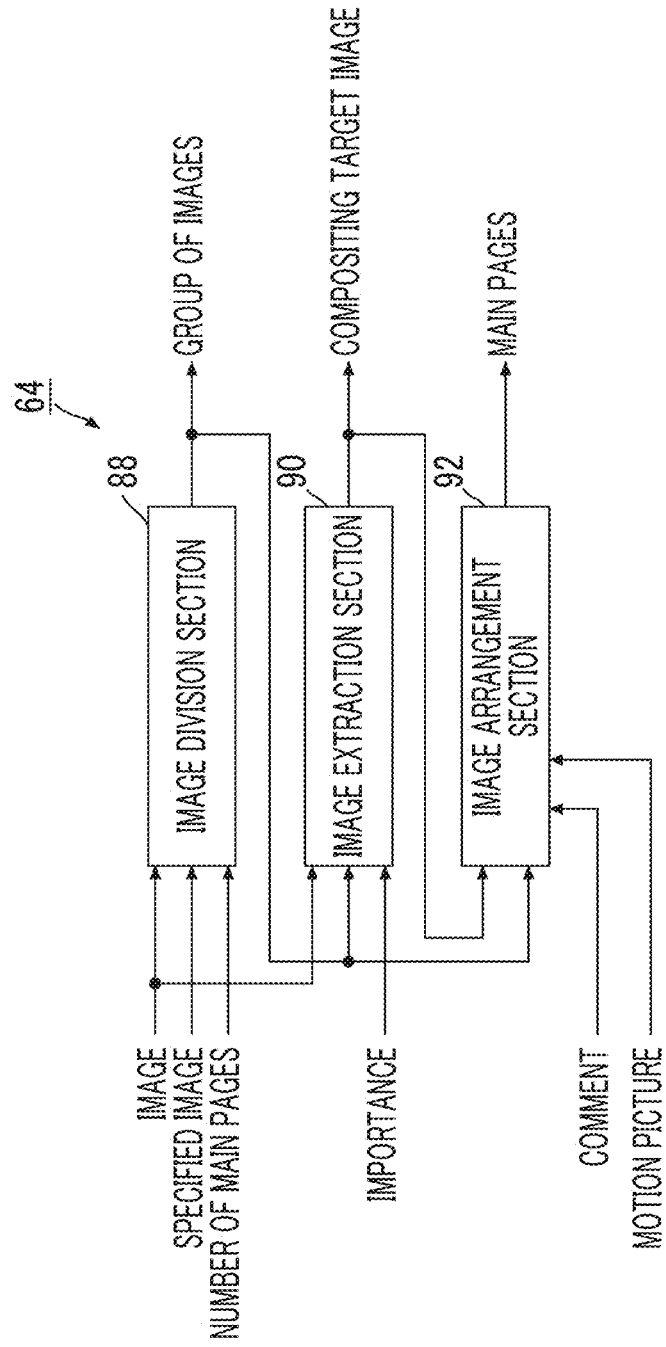
FIG. 8 is a block diagram of an embodiment showing the configuration of a main part creation section shown in FIG. 7.

As shown in FIG. 8, the main part creation section 64 includes an image division section 88, an image extraction section 90, an image arrangement section 92, and the like.

The image division section 88 divides a plurality of images acquired by the image acquisition section 46 into groups the number of which corresponds to the number of main pages.

The image extraction section 90 extracts, for each group of images, a plurality of compositing target images used in main pages, among images included in the group, based on the overall evaluation value of each image.

The image arrangement section 92 determines the size of each compositing target image extracted by the image extraction section 90 and the arrangement position in the main page, based on the overall evaluation value of each image, for each group of images, and arranges (automatically lays out) the compositing target images on the main pages of pages corresponding to the group of images.

Then, the writing creation section 66 creates a writing page using a message for writing and a profile image of each participating user that have been acquired by the message acquisition section 50. The writing creation section 66 creates a writing page of the design corresponding to the information of the product item stored in the setting storage section 38 and the information of the design of the writing acquired by the writing design setting section 34.

Figure 9:
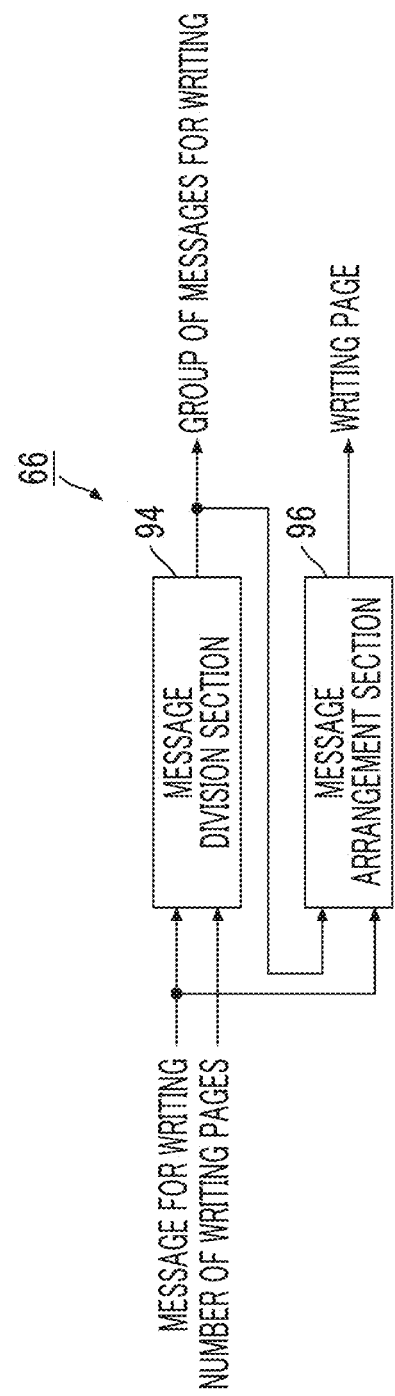
FIG. 9 is a block diagram of an embodiment showing the configuration of a writing creation section shown in FIG. 7.

As shown in FIG. 9, the writing creation section 66 includes a message division section 94, a message arrangement section 96, and the like.

The message division section 94 divides messages for writing acquired by the message acquisition section 50 into groups the number of which corresponds to the number of writing pages.

For each group of messages for writing, the message arrangement section 96 arranges a message for writing included in the group on the writing page of the page corresponding to the group of messages for writing.

The number of writing pages is set according to the number of participating users, the number of messages for writing, and the like. In addition, the number of main pages is set according to the number of pages of a composite image, the number of writing pages, and the like. In the case of the present embodiment, it is assumed that a 16-page photobook is created by setting the number of participating users to 2 to 36 persons and arranging 2 to 12 messages for writing on the writing page of one page.

Each section that forms the information setting unit 18, the information management unit 20, the data acquisition unit 22, the data analysis unit 24, and the composite image creation unit 26 is realized, for example, by causing a control device, such as a central processing unit (CPU), to execute a program loaded onto the memory. The data stored in each section is stored in a storage device, such as a hard disk drive (HDD), a solid state drive (SSD), and a secure digital (SD) memory, for example.

Figure 10:
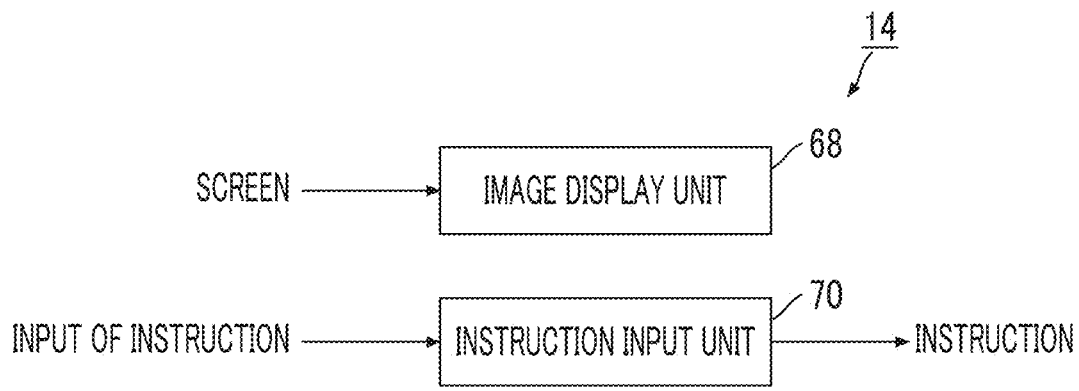
FIG. 10 is a block diagram of an embodiment showing the configuration of a terminal device of a user shown in FIG. 1.
Figure 11:
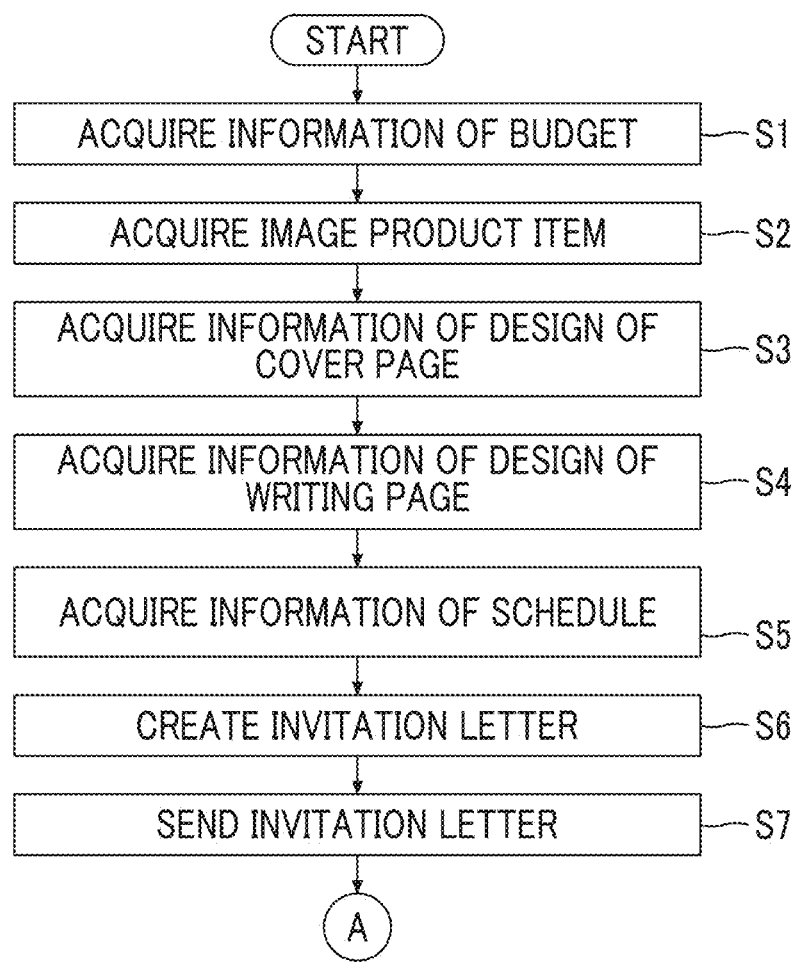
FIG. 11 is a flowchart of an embodiment showing the operation of the image processing system shown in FIG. 1.
Figure 12:
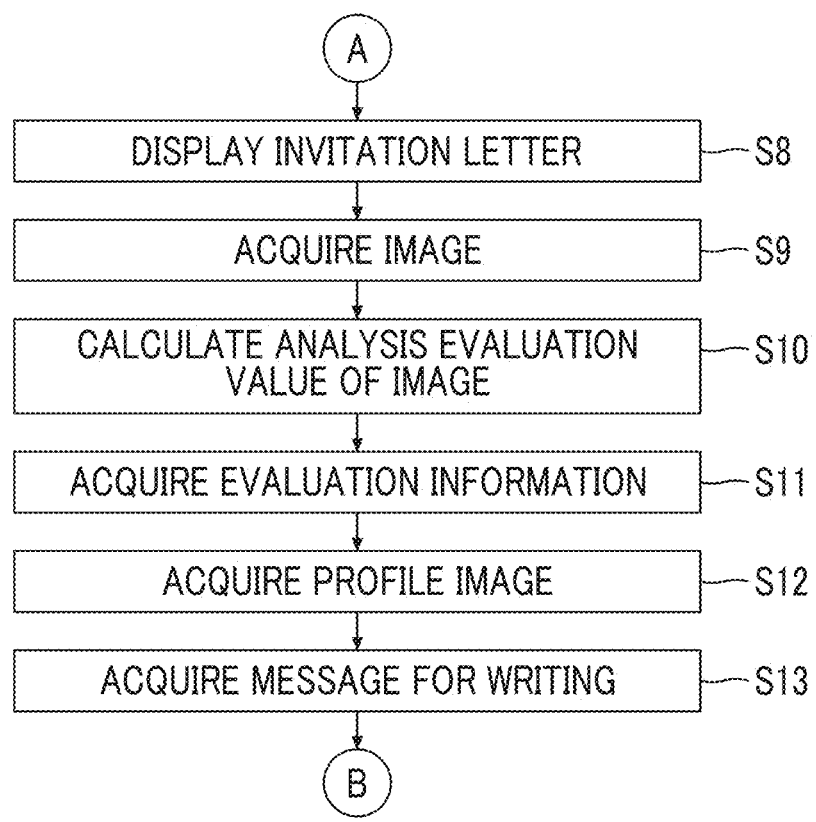
FIG. 12 is a flowchart of an embodiment showing the operation of the image processing system subsequent to FIG. 11.
Figure 13:
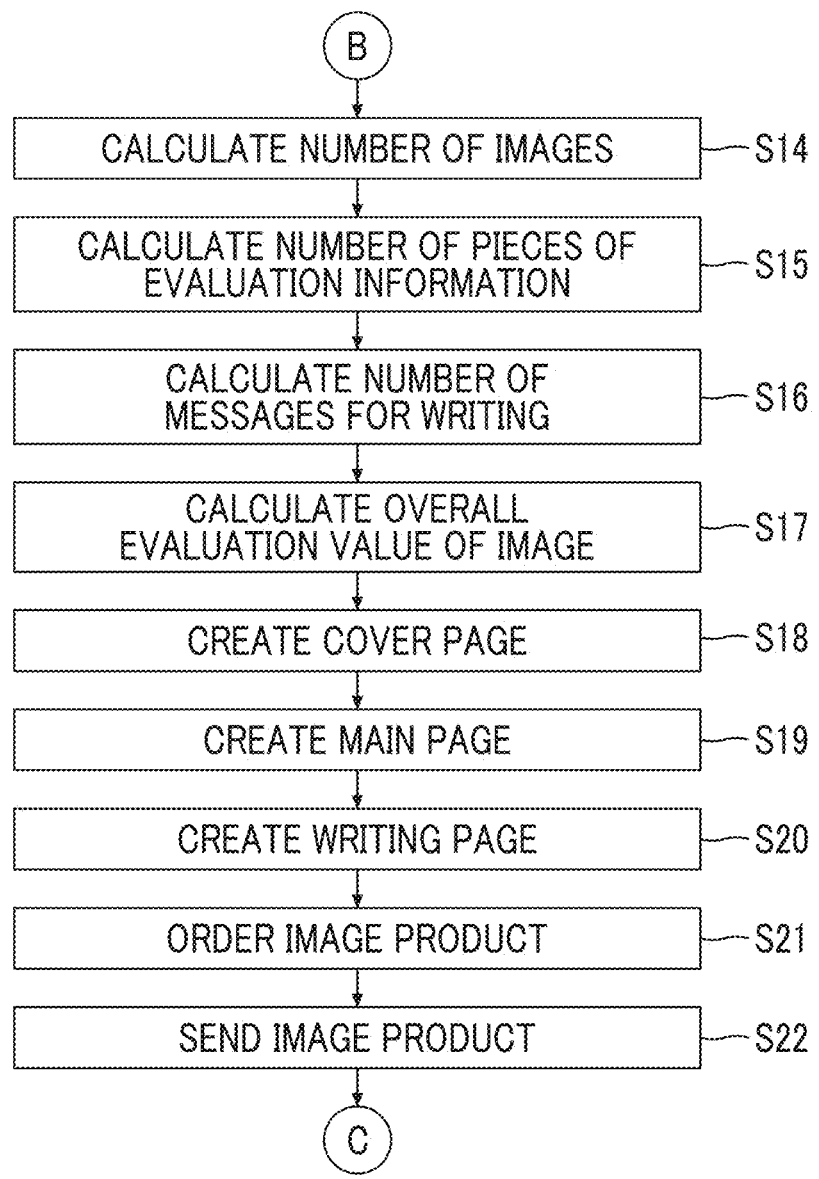
FIG. 13 is a flowchart of an embodiment showing the operation of the image processing system subsequent to FIG. 12.
Figure 14:
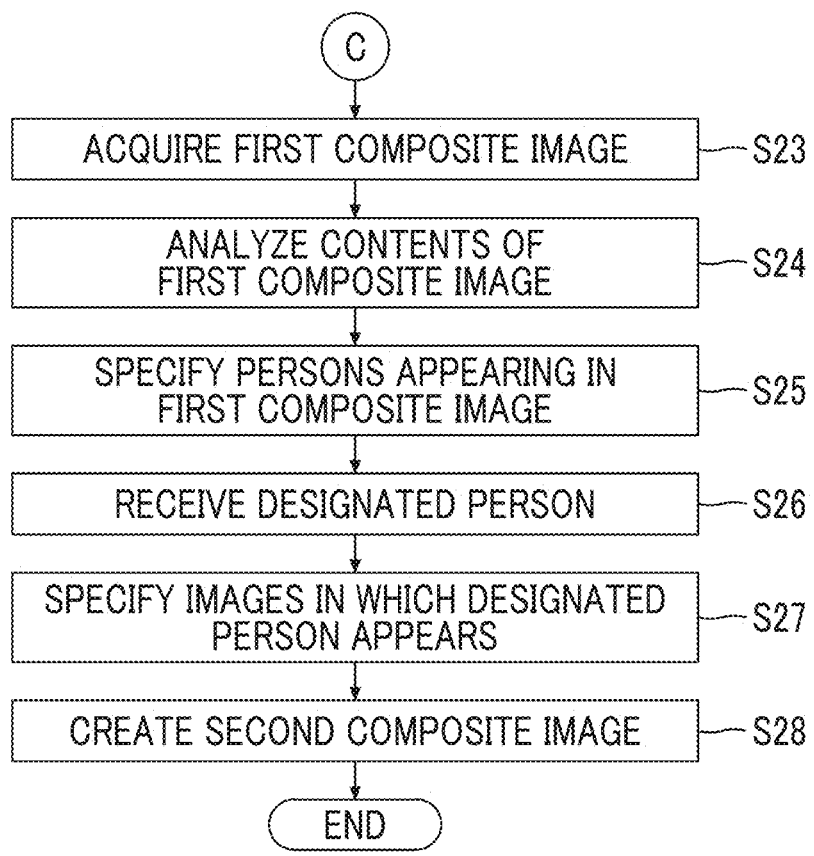
FIG. 14 is a flowchart of an embodiment showing the operation of the image processing system subsequent to FIG. 13.

Next, FIG. 10 is a block diagram of an embodiment showing the configuration of the terminal device 14 of each user shown in FIG. 1. The terminal device 14 of each user shown in FIG. 10 includes an image display unit 68 and an instruction input unit 70.

In the terminal device 14, the image display unit 68 displays various setting screens, selection screens, check screens, input screens, creation screens, and the like, and is formed by a display device, such as a liquid crystal display, for example.

Then, the instruction input unit 70 acquires various setting instructions, selection instructions, check instructions, input instructions, creation instructions, and the like input by the user, and is formed by input devices, such as a keyboard and a mouse.

In the case of the present embodiment, the image display unit 68 and the instruction input unit 70 are formed by a device in which a display device and an input device are integrated, such as a touch panel.

The number of terminal devices 14 corresponding to each user involved in the creation of a composite image does not necessarily to be one, and a plurality of terminal devices 14 may correspond to each user as long as the terminal devices 14 can correspond to the account of each user in the image processing system 10.

Although not shown, each of the server 12 and the terminal device 14 includes, for example, a transmission and reception unit, which is a communication device for transmitting and receiving various kinds of data between the server 12 and the terminal device 14, and a control unit, which is a CPU for controlling the operation of each unit.

Next, the operation of the image processing system 10 will be described with reference to flowcharts shown in FIGS. 11 to 14 and a display screen shown in FIGS. 15 to 37.

In the case of creating a composite image, first, a secretary user accesses a website for creating a composite image, which is provided by the image processing system 10, through the instruction input unit 70 in the terminal device 14 of the secretary user.

Figure 15:
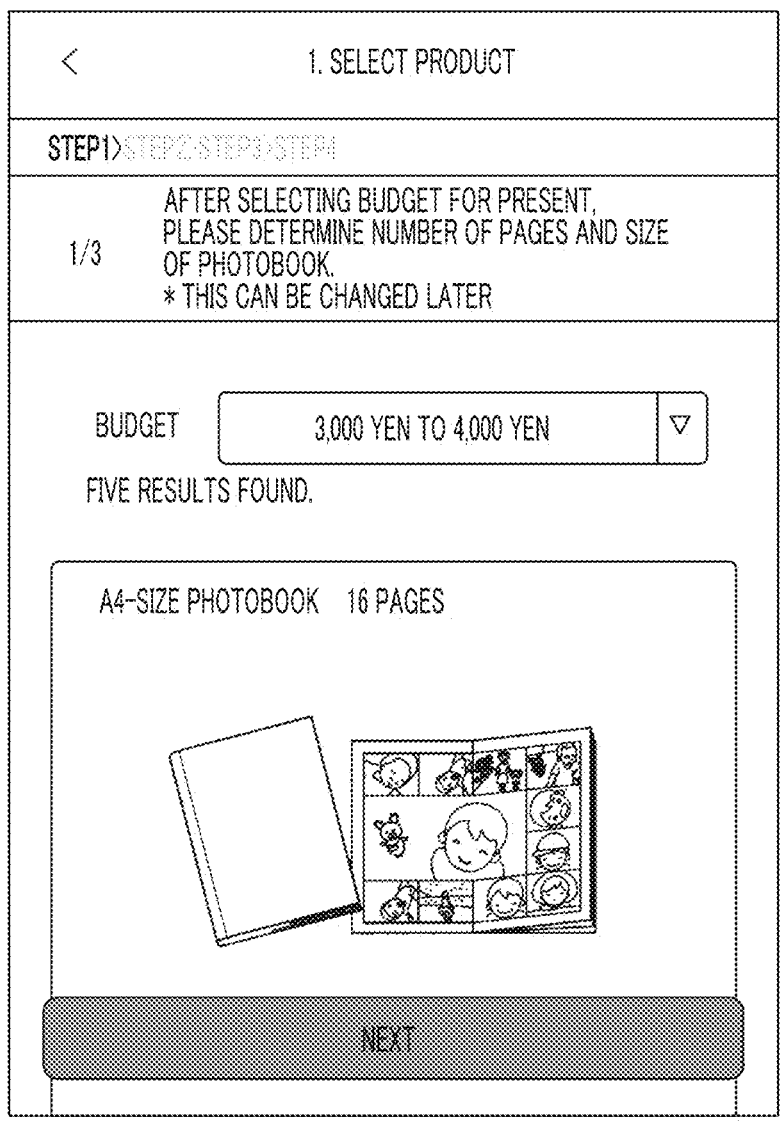
FIG. 15 is a conceptual diagram of an example showing a screen for setting a budget for a composite image.

In a case where the secretary user accesses the website for creating a composite image, as shown in FIG. 15, by the budget setting section 28 displays a screen for setting a budget for the composite image on the image display unit 68 of the terminal device 14 of the secretary user.

The secretary user sets a budget for the composite image to be created by the secretary user, through the instruction input unit 70, on the screen for setting the budget for the composite image. In the example shown in FIG. 15, a list of budgets for the composite image is registered in advance by the pull-down menu. The secretary user selects and sets one budget, for example, 3000 yen to 4000 yen, from the list of budgets for the composite image registered in the pull-down menu.

In a case where the budget for the composite image is set, the budget setting section 28 acquires the information of the budget for the composite image set by the secretary user from the terminal device 14 of the secretary user by (step S1).

Then, the product item acquisition section 30 presents one or more image product items corresponding to the information of the budget. In the example shown in FIG. 15, the product item acquisition section 30 presents five photobooks having different sizes and different page numbers as image product items.

In a case where the image product items are presented, the image display unit 68 of the terminal device 14 of the secretary user displays a screen for setting one image product item among the one or more image product items presented by the product item acquisition section 30.

The secretary user selects and sets one image product item, among the one or more presented image product items, through the instruction input unit 70 on the screen for setting an image product item. In the example shown in FIG. 15, a 16-page photobook of A4 size is set.

After a photobook is set as an image product item, in a case where a "Next" button is pressed, for example, in a case where the "Next" button is tapped or clicked, the product item acquisition section 30 acquires one image product item set by the secretary user (step S2).

In addition, in a case where a "<" button is pressed, it is possible to return to the previous screen. The same is true for subsequent screens.

Figure 16:
FIG. 16 is a conceptual diagram of an example showing a screen for setting the design of the cover page of a photobook.

Then, as shown in FIG. 16, the cover design setting section 32 displays a screen for setting the design of the cover page of the photobook on the image display unit 68 of the terminal device 14 of the secretary user.

The secretary user selects and sets the designs of one or more cover pages, through the instruction input unit 70, on the screen for setting the design of the cover page. In the example shown in FIG. 16, the secretary user selects and sets the design of one cover page among the designs of three cover pages. As the information of the design of the cover page of the photobook, for example, the secretary user can set the title of the photobook up to 20 characters to be described on the cover page and the color of the cover page.

After the design of the cover page is set, in a case where the "Next" button is pressed, the cover design setting section 32 acquires the information of the design of the cover page set by the secretary user from the terminal device 14 of the secretary user by (step S3).

Figure 17:
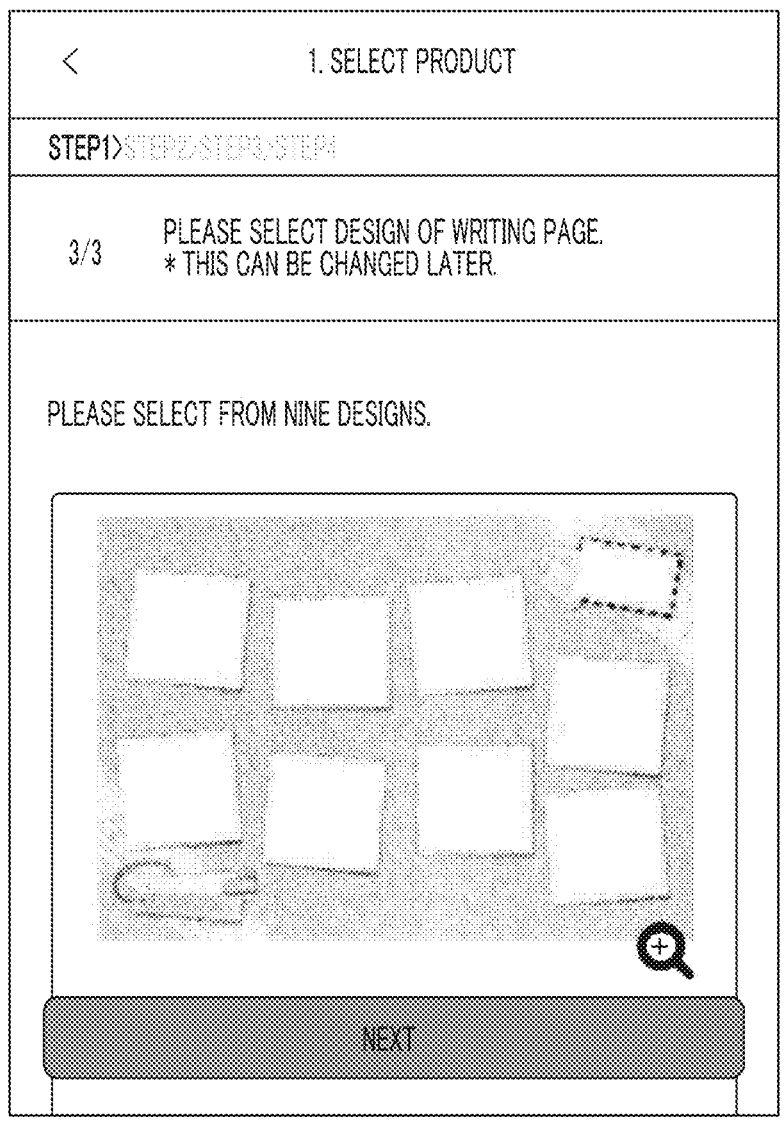
FIG. 17 is a conceptual diagram of an example showing a screen for setting the design of the writing page of a photobook.

Then, as shown in FIG. 17, the writing design setting section 34 displays a screen for setting the design of the writing page of the photobook on the image display unit 68 of the terminal device 14 of the secretary user.

The secretary user selects and sets the designs of one or more writings, through the instruction input unit 70, on the screen for setting the design of the writing page. In the example shown in FIG. 17, the secretary user selects and sets the design of one writing among the designs of nine writings.

After the design of the writing page is set, in a case where the "Next" button is pressed, the writing design setting section 34 acquires the information of the design of the writing page set by the secretary user from the terminal device 14 of the secretary user by (step S4).

Figure 18:
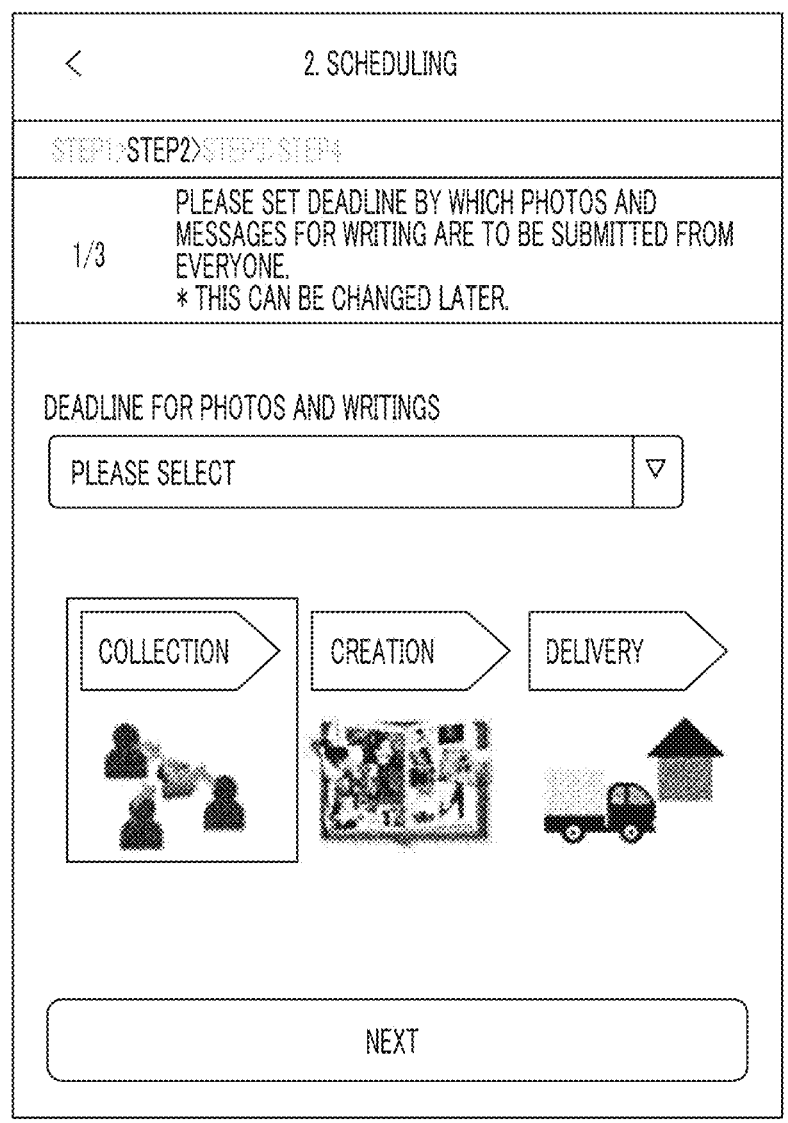
FIG. 18 is a conceptual diagram of an example showing a screen for setting the deadline for images and messages for writing.

Then, as shown in FIG. 18, the schedule setting section 36 displays a screen for setting the deadline for images and messages for writing on the image display unit 68 of the terminal device 14 of the secretary user.

The secretary user sets the deadline for images and messages for writing, through the instruction input unit 70, on the screen for setting the deadline for images and messages for writing. In the example shown in FIG. 18, a list of dates within a predetermined period from the current date is registered in advance by the pull-down menu. The secretary user selects and sets one date, for example, December 2, as the deadline, from the list of dates registered in the pull-down menu.

After the deadline for images and messages for writing is set, in a case where the "Next" button is pressed, the schedule setting section 36 acquires the information of the deadline for images and messages for writing set by the secretary user from the terminal device 14 of the secretary user (step S5).

Figure 19:
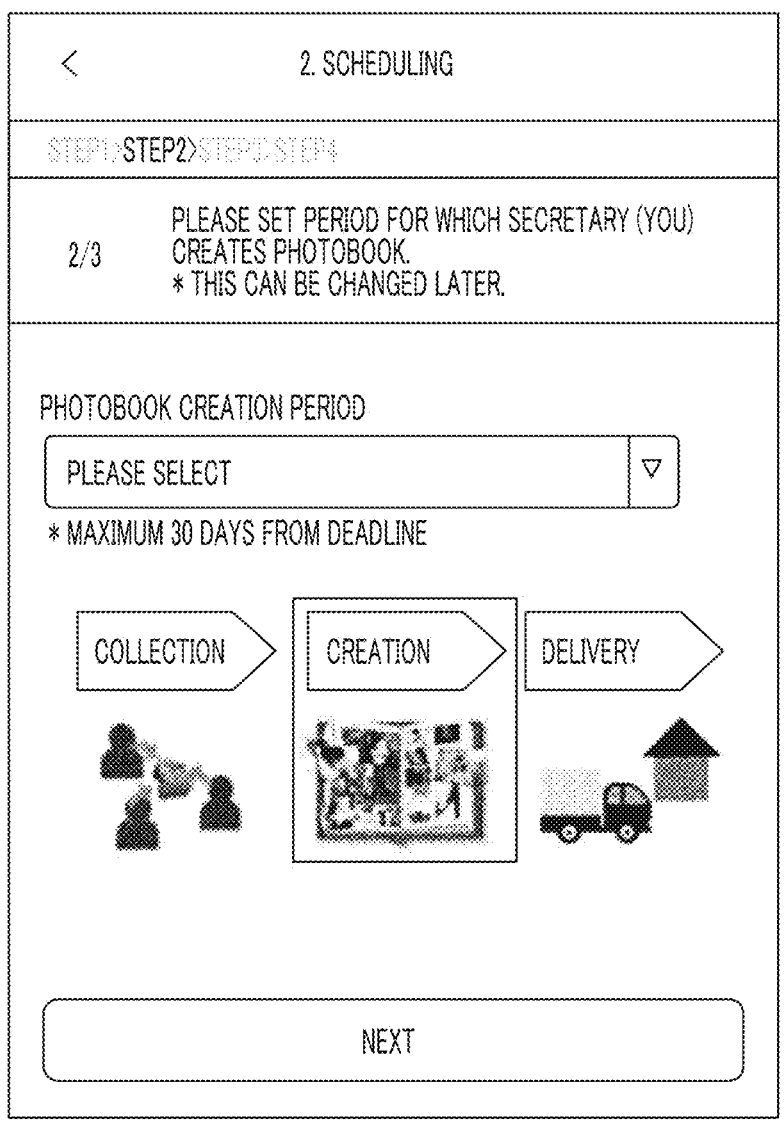
FIG. 19 is a conceptual diagram of an example showing a screen for setting a composite image creation period.

Then, as shown in FIG. 19, the schedule setting section 36 displays a screen for setting a composite image creation period on the image display unit 68 of the terminal device 14 of the secretary user.

The secretary user sets a composite image creation period, through the instruction input unit 70, on the screen for setting the composite image creation period. In the example shown in FIG. 19, a list of dates within 30 days from the deadline for the period of images and messages for writing is registered in advance by the pull-down menu. The secretary user sets December 2 to 4 as a creation period by selecting one date, for example, December 4 from the list of dates registered in the pull-down menu.

After the composite image creation period is set, in a case where the "Next" button is pressed, the schedule setting section 36 acquires the information of the composite image creation period set by the secretary user from the terminal device 14 of the secretary user (step S5).

Figure 20:
FIG. 20 is a conceptual diagram of an example showing a screen for setting the image product delivery date.

Then, as shown in FIG. 20, the schedule setting section 36 displays a screen for setting the delivery date of the image product on the image display unit 68 of the terminal device 14 of the secretary user.

The delivery date of the image product is automatically set to a date after a certain period from the deadline for the composite image creation period by the schedule setting section 36. In the example shown in FIG. 20, the delivery date of the image product is automatically set to December 20 after 16 days from December 4 that is the last day of the composite image creation period.

The secretary user can change the image product delivery date, through the instruction input unit 70, on the screen for setting the image product delivery date. In the example shown in FIG. 20, it is possible to set the image product delivery date to a date before December 20, for example, by paying an extra fee and designating the express finish.

After the image product delivery date is set, in a case where the "Next" button is pressed, the schedule setting section 36 acquires the information of the image product delivery date (step S5).

Conventionally, in the case of creating a composite image using a plurality of images transmitted from the terminal devices 14 of a plurality of users, the burden on the secretary user was high since it was necessary for the secretary user to manage the time limit. On the other hand, since the image processing system 10 in the present embodiment can manage the time limit, it is not necessary for the secretary user to manage the time limit. Therefore, it is possible to reduce the burden on the secretary user.

Figure 21:
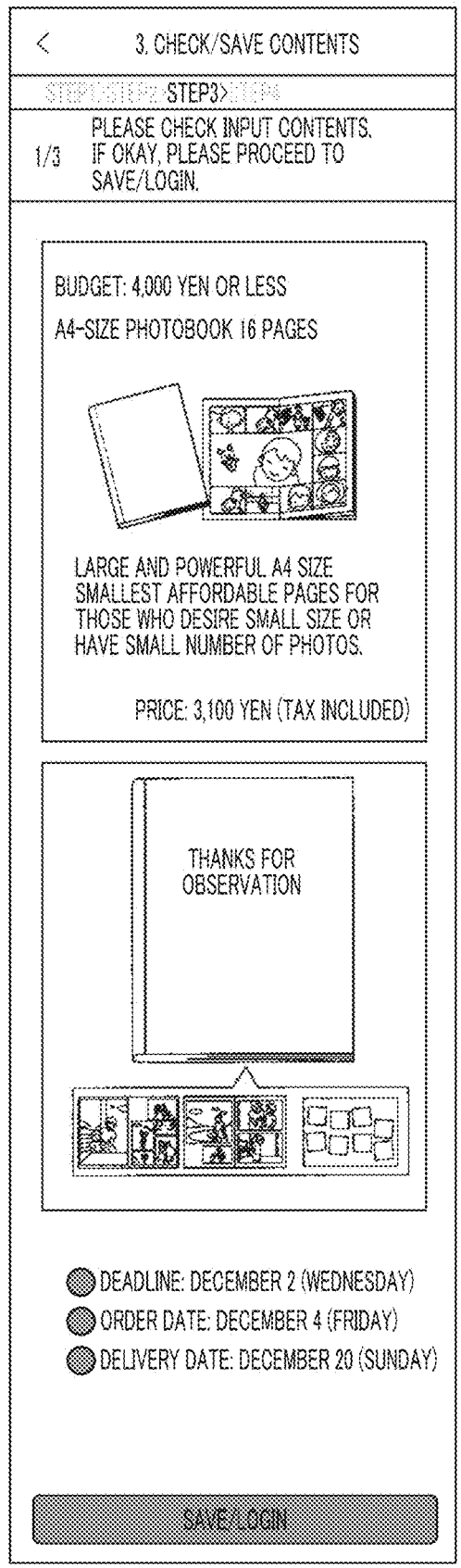
FIG. 21 is a conceptual diagram of an example showing a screen for checking the information of image product items and a schedule.

Then, as shown in FIG. 21, the setting storage section 38 displays a screen for checking the information of the image product item and the schedule on the image display unit 68 of the terminal device 14 of the secretary user.

On the screen for checking the information of the image product item and the schedule, the secretary user checks the information of the image product item and the schedule. In a case where the setting is acceptable, a "Save/login" button is pressed to proceed to the next screen. In a case where it is necessary to change the setting, the "<" button is pressed to return to the previous screen.

In a case where the "Save/login" button is pressed, as shown in FIG. 22, the setting storage section 38 displays a screen for the secretary user to input account information for logging in to the image processing system 10 on the image display unit 68 of the terminal device 14 of the secretary user.

The secretary user inputs the e-mail address of the secretary user and the secretary password, as account information for logging in to the image processing system 10, through the instruction input unit 70. In a case where the secretary user has already completed membership registration to the image processing system 10, a "Login" button is pressed. In a case where the secretary user has forgotten the secretary password after membership registration, processing for recovering the secretary password is performed by pressing a "Password forgot" button.

In a case where the "Login" button is pressed, the account information storage section 40 compares the already stored account information with the account information input by the secretary user. In a case where the already stored account information matches the account information input by the secretary user as a result of comparison of the account information storage section 40, the secretary user can log in to the image processing system 10.

On the other hand, in a case where membership registration has not yet been completed, the image processing system 10 performs processing for new membership registration by pressing a "New membership registration" button. In a case where the "New membership registration" button is pressed, the account information storage section 40 acquires the e-mail address and the secretary password input by the secretary user, and stored the e-mail address and the secretary password as the account information of the secretary user. After the membership registration is completed, the terminal device 14 of the secretary user can log in to the image processing system 10.

Then, the setting storage section 38 stores the information of the image product item acquired by the product item acquisition section 30 and the schedule acquired by the schedule setting section 36.

Then, as shown in FIG. 23, the setting storage section 38 displays a screen, which shows that the login of the secretary user and the storage of the information of the image product item and the schedule have been completed, on the image display unit 68 of the terminal device 14 of the secretary user.

Then, the management screen information transmission section 42 transmits a message including the URL for accessing the management screen. The message includes a notice indicating that the information of the image product item and the schedule has been stored.

In the example shown in FIG. 23, the management screen information transmission section 42 can transmit a message including the URL for accessing the management screen not only to the e-mail address of the secretary user but also to the e-mail address of participating users other than the secretary user, for example, the e-mail address of a deputy secretary user who acts as a secretary user, by inputting the e-mail address of participating users other than the secretary user through the instruction input unit 70.

Figures 24, 25:
FIG. 24 is a conceptual diagram of an example showing a screen for creating an invitation letter to be sent to a terminal device of a participating user.
FIG. 25 is a conceptual diagram of an example showing a screen for checking the contents of an invitation letter.

Then, in a case where the "Next" button is pressed, as shown in FIG. 24, the upload prompting section 44 displays a screen for creating an invitation letter to be sent to the terminal device 14 of the participating user on the image display unit 68 of the terminal device 14 of the secretary user.

On the screen for creating an invitation letter, the secretary user inputs a message included in the invitation letter within a predetermined number of characters, in the example shown in FIG. 24, 150 characters, through the instruction input unit 70. In the example shown in FIG. 24, an initial message "Let's make a photobook with your photos and messages!" is automatically input. Therefore, it is possible to save the time and effort for the secretary user to input a message. The secretary user may use the initial message as it is, or may input other messages.

In a case where the "Next" button is pressed, the upload prompting section 44 acquires the information of the message included in the invitation letter and creates an invitation letter (step S6).

Then, as shown in FIG. 25, the upload prompting section 44 displays a screen for checking the contents of the invitation letter on the image display unit 68 of the terminal device 14 of the secretary user.

On the screen for checking the contents of the invitation letter, the secretary user checks the contents of the invitation letter. In a case where the contents are acceptable, a "To invitation letter send screen" button is pressed to proceed to the next screen. In a case where it is necessary to change the contents, the "<" button is pressed to return to the previous screen.

In a case where the "To invitation letter send screen" button is pressed, as shown in FIG. 26, the upload prompting section 44 displays a screen for sending an invitation letter to the terminal device 14 of the participating user on the image display unit 68 of the terminal device 14 of the secretary user.

On the screen for sending an invitation letter, the secretary user selects means for sending an invitation letter through the instruction input unit 70. In the example shown in FIG. 26, the secretary user selects an SNS message or e-mail as means for sending an invitation letter. The invitation letter is sent to the SNS account of the participating user as an SNS message in a case where an "SNS" button is pressed, and is transmitted to the e-mail address of the participating user by e-mail in a case where an "E-mail" button is pressed.

The secretary user may send the invitation letter to all participating users involved in the creation of a composite image, or may send the invitation letter to only some participating users.

The SNS message or the e-mail includes not only the invitation letter but also images used in a composite image, evaluation information of images, an invitation URL for accessing the screen for each participating user to upload messages for writing or the like, and a common password (in the example shown in FIG. 26, "5865").

In a case where the "Next" button is pressed, the upload prompting section 44 sends the invitation letter to the terminal device 14 of each participating user (step S7).

Each participating user receives the invitation letter through the terminal device 14 of the participating user, and accesses a website indicated by the invitation URL through the instruction input unit 70.

In a case where the participating user accesses the website indicated by the invitation URL, as shown in FIG. 27, the upload prompting section 44 displays a screen showing the invitation letter received by the participating user on the image display unit 68 of the terminal device 14 of the participating user by (step S8).

In the invitation letter, in addition to the message from the secretary user, uploading images and messages for writing used in the composite image and information on the deadline (in the case of the present embodiment, 23:59 on Wednesday, December 2) are displayed as a request for participating users.

Each participating user views the screen showing the invitation letter to understand that the request to the participating user from the secretary user is the upload of images and messages for writing to be made as a photobook and that the deadline is December 2.

Figure 28:
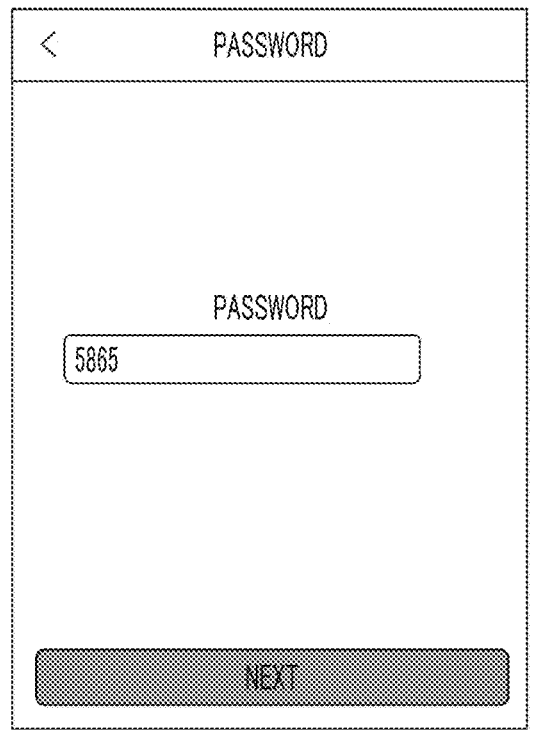

Then, in a case where a check box of "agree with terms and conditions" is checked and the "Next" button is pressed, as shown in FIG. 28, the account information storage section 40 displays a screen for inputting a common password for accessing a screen for the participating user to upload images used in the composite image, evaluation information of images, messages for writing, and the like on the image display unit 68 of the terminal device 14 of the participating user.

On the screen for inputting a common password, the participating user inputs the common password included in the received invitation letter (in the example shown in FIG. 28, "5865") through the instruction input unit 70.

Figure 29:
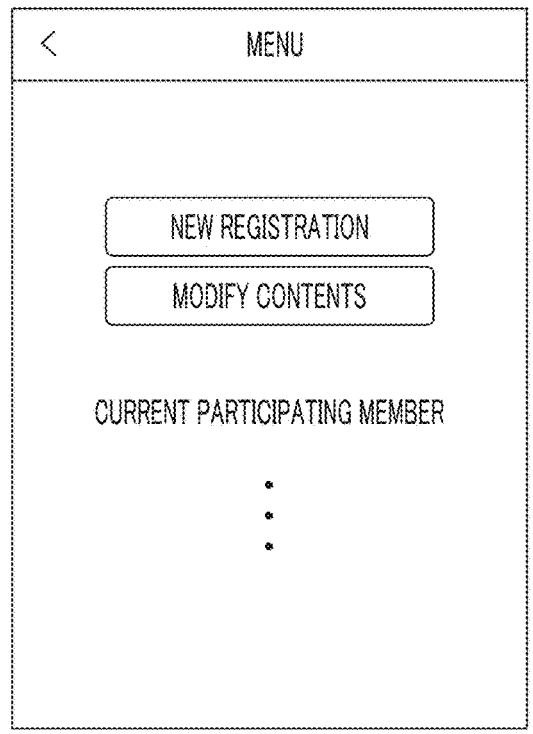
FIG. 29 is a conceptual diagram of an example showing a screen for registering a new participating user.

In a case where the common password is input and the "Next" button is pressed, as shown in FIG. 29, the account information storage section 40 displays a screen for registering a new participating user on the image display unit 68 of the terminal device 14 of the participating user.

On the screen for registering a new participating user, the name of a user (current participating member) who is already registered as a participating user is displayed. It is not essential to display the names of registered participating users. However, by displaying the names of registered participating users, in a case where a user registers a participating user newly, the user can register the participating user with confidence in a case where the name that the user knows is included in the names of the registered participating users.

Each participating user presses a "New registration" button in a case where the participating user has not yet been registered in the image processing system 10, and presses "Modify contents" button in a case where the participating user has already been registered in the image processing system 10.

In a case where the "New registration" button is pressed, as shown in FIG. 30, the account information storage section 40 displays a screen for registering a name and an individual password (in FIG. 30, displayed as "secret code") to be registered as a participating user on the image display unit 68 of the terminal device 14 of the participating user.

The participating user inputs a real name or nickname as a name and inputs certain character string as a secret code through the instruction input unit 70.

The name and the secret code of the participating user are account information of the participating user. As shown in FIG. 29, the participating user can modify images, evaluation information of images, messages for writing, and the like, which have already been uploaded, by pressing the "Modify contents" button on the screen for registering a new participating user and inputting the name and the secret code that have already been registered.

In a case where the name and the secret code of the participating user are input and the "Next" button is pressed, the account information storage section 40 acquires the name and the secret code of the participating user, and stores the name and the secret code of the participating user as the account information of the participating user.

Then, as shown in FIG. 31, the image acquisition section 46 displays a screen for selecting an image uploaded by the participating user on the image display unit 68 of the terminal device 14 of the participating user.

The participating user can select an image to be uploaded by pressing an "Add image" button on the screen for selecting an image to be uploaded. The number of images selected by the participating user is displayed on the screen for selecting an image to be uploaded.

After an image to be uploaded is selected, in a case where the "Next" button is pressed, the image acquisition section 46 acquires the image uploaded from the participating user, that is, the image submitted from the terminal device 14 of the participating user (step S9). Thus, the image acquisition section 46 acquires a plurality of images transmitted from the terminal devices 14 of two or more participating users. Each time an image is acquired by the image acquisition section 46, the image analysis section 58 analyzes the image, and the evaluation value calculation section 60 calculates the analysis evaluation value of the image based on the analysis result of the image (step S10).

Figure 32:
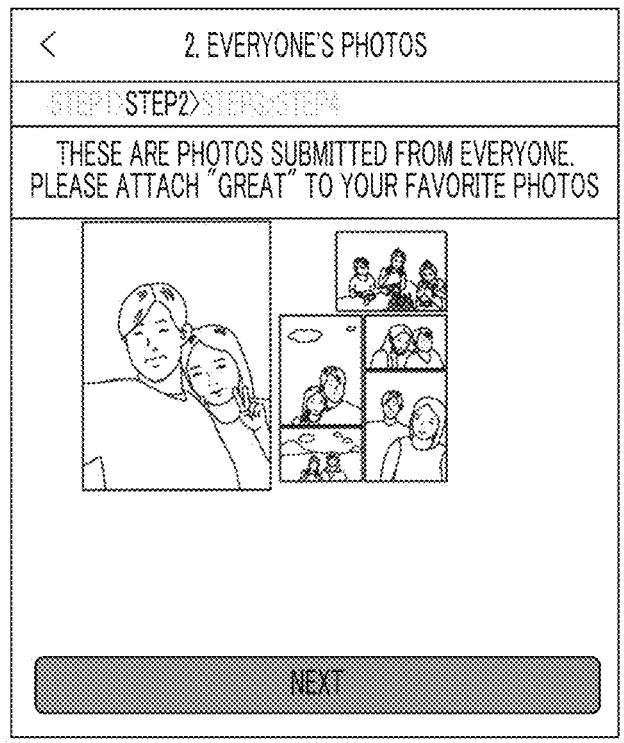
FIG. 32 is a conceptual diagram of an example showing a screen for evaluating each of a plurality of images transmitted from terminal devices of two or more participating users.

Then, as shown in FIG. 32, the evaluation information acquisition section 48 displays a screen for evaluating each of the plurality of images transmitted from the terminal devices 14 of two or more participating users on the image display unit 68 of the terminal device 14 of each participating user.

The participating user can give evaluation information indicating high evaluation or low evaluation to each image through the instruction input unit 70 on the screen for evaluating each image. For example, the participating user can view each image, and can give evaluation information indicating high evaluation to an image that the participating user likes by pressing a "Good" button and give evaluation information indicating low evaluation to an image that the participating user dislikes by pressing a "Not good" button.

In a case where evaluation information indicating high evaluation and low evaluation is given to each image from the terminal device 14 of each participating user, the evaluation information acquisition section 48 acquires the evaluation information indicating high evaluation and low evaluation given to each image from the terminal device 14 of the participating user (step S11).

Figure 33:
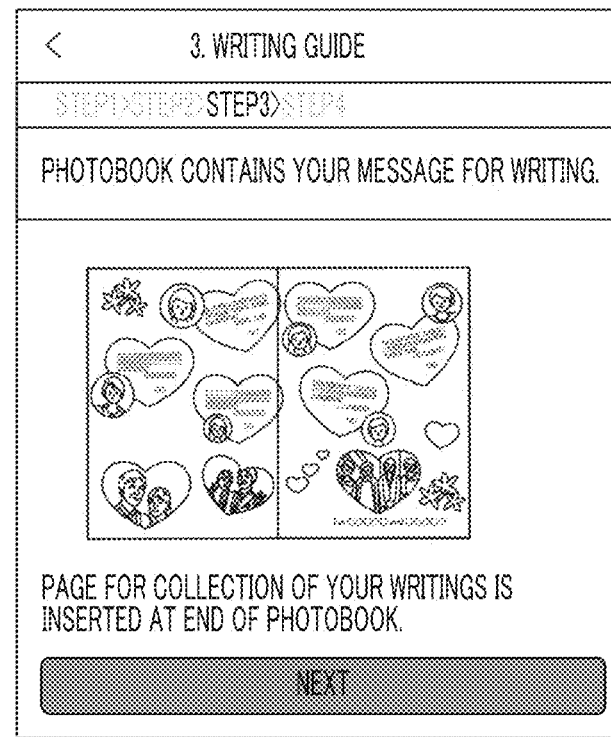
FIG. 33 is a conceptual diagram of an example showing a screen for notifying that a writing page has been inserted at the end of a photobook.

After the evaluation information is given, in a case where the "Next" button is pressed, as shown in FIG. 33, the message acquisition section 50 displays a screen for notifying that a writing page has been inserted at the end of the photobook on the image display unit 68 of the terminal device 14 of the participating user.

The participating user views and checks the screen for notifying that a writing page has been inserted at the end of the photobook.

Figure 34:
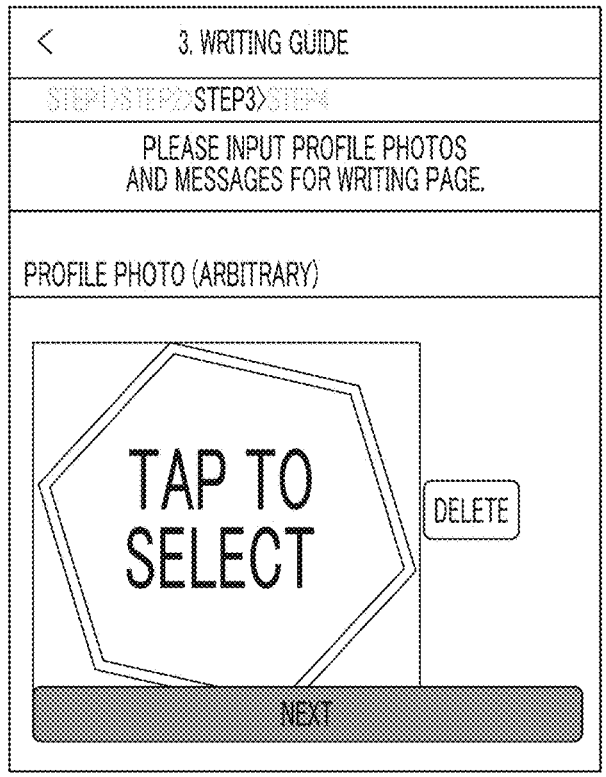
FIG. 34 is a conceptual diagram of an example showing a screen for setting a profile image of a participating user used in a writing page.

Then, in a case where the "Next" button is pressed, as shown in FIG. 34, the message acquisition section 50 displays a screen for setting the profile image of the participating user used in the writing page on the image display unit 68 of the terminal device 14 of the participating user.

The participating user can select and set an image to be used as a profile image, among images owned by the participating user in the terminal device 14 of the participating user, through the instruction input unit 70, on the screen for setting the profile image. In addition, the participating user can delete the already set profile image by pressing a "Delete" button, and can set the profile image again.

After the participating user has set the profile image, in a case where the "Next" button is pressed, the image acquisition section 46 acquires the profile image set by the participating user from the terminal device 14 of the participating user (step S12).

Figure 35:
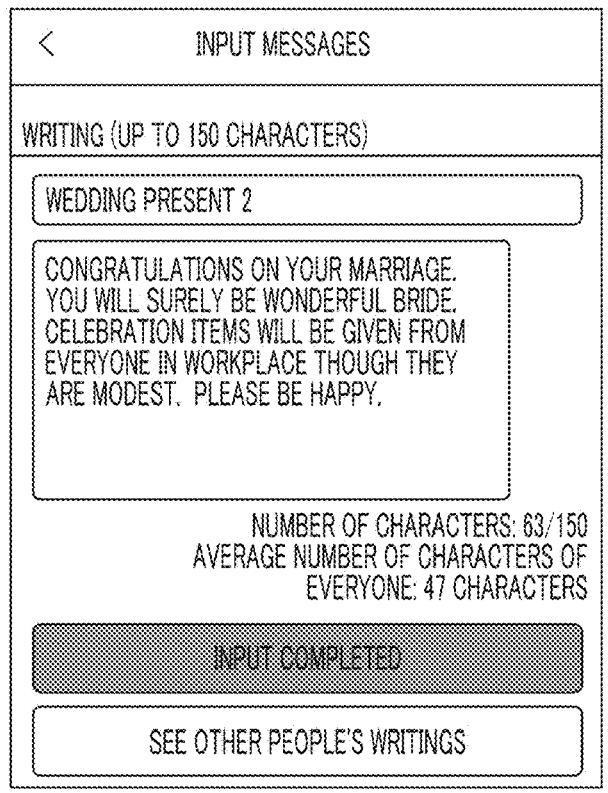
FIG. 35 is a conceptual diagram of an example showing a screen for inputting a message for writing.

Then, as shown in FIG. 35, the message acquisition section 50 displays a screen for inputting a message for writing on the image display unit 68 of the terminal device 14 of the participating user.

On the screen for inputting a message for writing, the participating user inputs a message included in the writing page within 150 characters through the instruction input unit 70. In the example shown in FIG. 35, an initial message "Congratulations on your marriage . . . . Please be happy" is automatically input. Therefore, it is possible to save the time and effort for the participating user to input a message. The participating user may use the initial message as it is, or may input other messages.

In addition, each participating user can view messages for writing that other participating users have already uploaded by pressing a "See other people's writings" button on the screen for inputting a message for writing.

Figure 36:
FIG. 36 is a conceptual diagram of an example showing a screen for checking a message for writing input by a participating user.

After the participating user has input the message for writing, in a case where an "Input completed" button is pressed, as shown in FIG. 36, the message acquisition section 50 displays a screen for checking the message for writing input by the participating user on the image display unit 68 of the terminal device 14 of the participating user.

On the screen for checking a message for writing, the participating user views and checks a message for writing. In a case where the message is acceptable, a "Submit" button is pressed to proceed to the next screen. In a case where it is necessary to change the message, the "<" button is pressed to return to the previous screen.

In a case where the "Submit" button is pressed, the message acquisition section 50 acquires a message for writing submitted by the participating user, that is, a message for writing uploaded from the terminal device 14 of the participating user (step S13).

Thus, in the case of creating a composite image, such as a photobook, using images of a plurality of users, it is possible to convey the feeling of each participating user to the recipient of the photobook as a message for writing by including not only the main page but also the writing page of the photobook.

Figure 37:
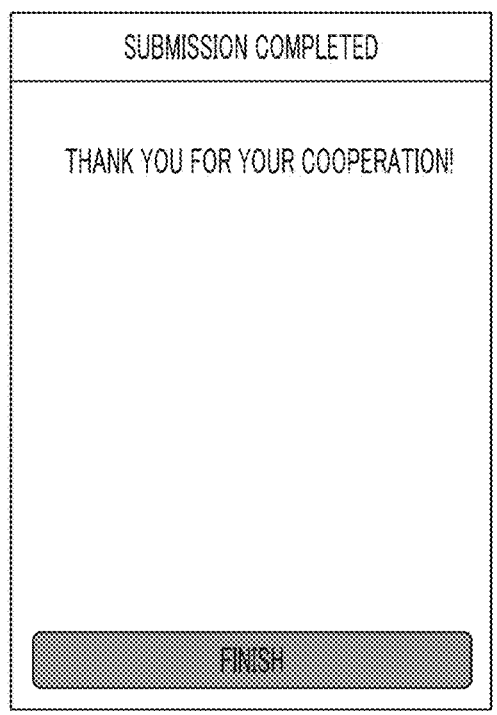
FIG. 37 is a conceptual diagram of an example showing a screen showing that the uploading of a message for writing has been completed.

Then, as shown in FIG. 37, a screen showing that the submission of the message for writing has been completed is displayed on the image display unit 68 of the terminal device 14 of the participating user.

Then, in a case where a "completed" button is pressed, the uploading of images, evaluation information of images, and messages for writing is completed.

Then, in a case where the schedule setting section 36 detects that the deadline for images and messages for writing has passed, the number-of-images calculation section 52 calculates the number of images acquired by the image acquisition section 46 (step S14). In addition, the number-of-evaluations calculation section 54 calculates the number of pieces of evaluation information indicating high evaluation and low evaluation that has been acquired by the evaluation information acquisition section 48 (step S15), and the number-of-messages calculation section 56 calculates the number of messages for writing acquired by the message acquisition section 50 (step S16).

Then, based on the evaluation information indicating high evaluation and low evaluation for each image, for example, the number of pieces of evaluation information, the evaluation value calculation section 60 adds or subtracts a value to or from the analysis evaluation value of each image to calculate the overall evaluation value of each image (step S17).

As described above, it is not essential to analyze an image and calculate the analysis evaluation value each time an image is acquired. However, by analyzing an image and calculating the analysis evaluation value each time an image is acquired, it is possible to calculate the overall evaluation value of an image in a short period of time compared with a case where all images are acquired and then the images are collectively analyzed to calculate the analysis evaluation value. As a result, it is possible to shorten the time taken to create a composite image.

Then, the secretary user instructs the composite image creation unit 26 to create a composite image through the instruction input unit 70 in the terminal device 14 of the secretary user.

In a case where the composite image creation unit 26 is instructed to create a composite image, the cover creation section 62 creates a cover page which is a design corresponding to the information of the design of the cover page, on which the title set by the secretary user is written, and which has a color set by the secretary user (step S18).

Then, the main part creation section 64 creates a main page of the photobook using at least one image among the plurality of images acquired by the image acquisition section 46 (step S19).

The image division section 88 of the main part creation section 64 divides a plurality of images acquired by the image acquisition section 46 into a plurality of groups corresponding to the number of main pages.

Then, for each group of images, based on the overall evaluation value of each image, the image extraction section 90 extracts a plurality of compositing target images used in the main pages, among the images included in the group, in order from the image with the highest overall evaluation value.

Then, for each group of images, the image arrangement section 92 determines the size of each compositing target image and the arrangement position in the main page based on the overall evaluation value of each image, and arranges the compositing target image on the corresponding main page. For example, a compositing target image with the highest overall evaluation value among a plurality of compositing target images arranged on the main page is arranged at the center position of the page with a size larger than the other compositing target images.

Then, the writing creation section 66 creates a writing page of the design corresponding to the information of the design of the writing page by using the profile images and messages for writing of participating users (step S20).

The message division section 94 of the writing creation section 66 divides the messages for writing acquired by the message acquisition section 50 into groups the number of which corresponds to the number of writing pages.

Then, for each group of messages for writing, the message arrangement section 96 arranges a message for writing on the writing page of the page corresponding to the group of messages for writing to create the writing page. For example, the message arrangement section 96 arranges a message for writing included in the group and a profile image of the corresponding participating user in combination. In each writing page, for example, the message arrangement section 96 sequentially arranges messages for writing in order in which the messages for writing are uploaded.

As described above, the cover creation section 62 automatically creates a cover page corresponding to the information of the design of the cover page. The main part creation section 64 automatically creates a main page using a plurality of images acquired from the terminal devices 14 of two or more participating users. The writing creation section 66 automatically creates a writing page of the design corresponding to the information of the design of the writing page by using the profile images and messages for writing of participating users. In this manner, the composite image creation unit 26 automatically creates a photobook including the cover page corresponding to the information of the design of the cover page, the main page, and the writing page corresponding to the information of the design of the writing page.

In the image processing system 10, it is possible to create a composite image, such as a photobook including not only the main page but also the writing page. In addition, it is possible to create a composite image reflecting not only the image quality but also the preferences of a plurality of participating users by determining not only images used in the main page but also the size of each image and the arrangement position in the main page based on the overall evaluation value of each image.

The secretary user views each page of the photobook, which includes the cover page, the main page, and the writing page that have been automatically created, in the terminal device 14 of the secretary user. The secretary user may adopt the photobook created automatically as it is, or may edit the contents of each page, for example, images used in each page, the size of each image, and the arrangement positions of images and messages for writing. In addition, the secretary user can add comments, add a stamp image, and change the background type and color of each page.

The secretary user completes the edition of the photobook during the composite image creation period set by the schedule setting section 36, in the case of the present embodiment, by December 4, and orders an image product with the contents of the photobook that has been created (step S21). The image product ordered by the secretary user includes at least one of a photobook of a paper medium and a photobook of electronic data.

In a case where the image product is ordered, the photobook of the ordered image product is created and is sent to the delivery address by the delivery date of the image product set by the schedule setting section 36, in the case of the present embodiment, by December 20 (step S22). In the case of a photobook of a paper medium, for example, the photobook of a paper medium is transmitted to the delivery address. In the case of a photobook of electronic data, for example, the photobook of electronic data or an URL for downloading electronic data is transmitted to the e-mail address of the delivery address.

As described above, in the image processing system 10, it is possible to create a composite image, such as a photobook including a writing page, using a plurality of images and messages for writing acquired from the terminal devices 14 of a plurality of participating users.

As described above, in a case where a photobook is created using compositing target images extracted from a plurality of images owned by a plurality of participating users and the created photobook is sent to the delivery address, the recipient of the photobook can create another composite image different from the received photobook using images of a person, which appears in the photobook, in the first image group owned by the recipient by using the image processing system 10.

In the following description, it is assumed that the recipient creates a second composite image, such as a postcard with an image, based on a first composite image, such as a received photobook. In addition, it is assumed that various kinds of information regarding the first composite image are stored in the image processing system 10 even after the recipient receives the first composite image.

Figure 38:
FIG. 38 is a conceptual diagram of an example showing a screen for notifying that a second composite image is to be created.

First, as shown in FIG. 38, in the case of creating the second composite image, the first composite image acquisition section 98 displays a screen for notifying that a postcard with an image is to be created, as the second composite image, on the image display unit 68 of the terminal device 14 of the recipient.

The recipient presses the "Next" button on the screen for notifying that a second composite image is to be created, and designates a photobook received by the recipient, as a first composite image, through the instruction input unit 70.

Then, in a case where the first composite image is designated by the recipient, the first composite image acquisition section 98 acquires the first composite image owned by the recipient from the terminal device 14 of the recipient (step S23).

Then, the image analysis section 58 analyzes the contents of the first composite image, that is, the contents of each image used in the first composite image (step S24).

Then, based on the analysis result of the first composite image, the person specifying section 82 specifies a plurality of persons appearing in the first composite image (step S25).

Figure 39:
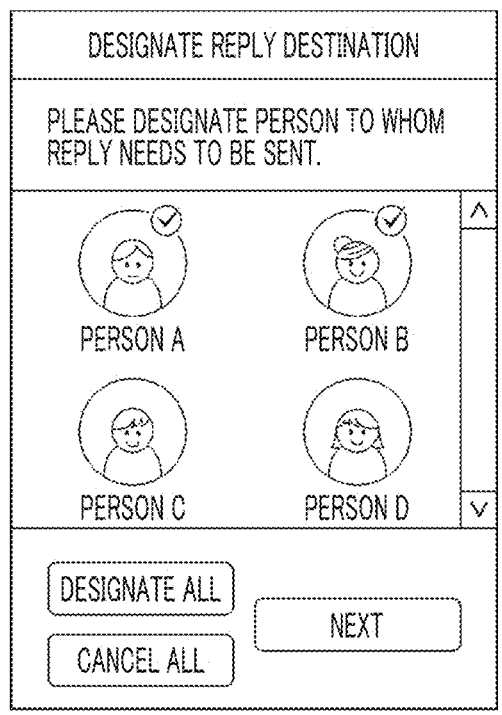
FIG. 39 is a conceptual diagram of an example showing a screen for designating a person.

Then, as shown in FIG. 39, the designated person receiving section 84 displays a screen, which is for designating one or more persons as designated persons among a plurality of persons appearing in the first composite image, on the image display unit 68 of the terminal device 14 of the recipient.

On the screen for designating a person, the recipient designates a person who needs to be used in the second composite image, that is, one or more persons (designated persons) appearing in the image used in creating the second composite image, among a plurality of persons appearing in the first composite image through the instruction input unit 70.

For example, on the screen for designating a person, the recipient designates a designated person by checking the face image of a person who needs to be used in the second composite image, among the plurality of persons appearing in the first composite image, through the instruction input unit 70. In the case of the example shown in FIG. 39, the recipient designates two persons of person A and person B as designated persons among a plurality of persons including person A, person B, person C, person D, . . . appearing in the first composite image.

In addition, for example, by swiping up and down a region where the face image of a person is displayed on the screen for designating a person, the recipient can display and designate the face images of other persons that are not displayed. By pressing a "Designate All" button, it is possible to designate all persons appearing in the first composite image. In addition, by pressing a "Cancel All" button, it is possible to cancel the designation of all persons and start from the beginning.

Then, in a case where the "next" button is pressed, the designated person receiving section 84 receives the designation of one or more persons designated by the recipient (step S26).

Then, as shown in FIG. 40, in a case where the designation of a person is received, the first image group storage section 102 displays a screen for designating a first image group owned by the recipient on the image display unit 68 of the terminal device 14 of the recipient.

In the case of the example shown in FIG. 40, a field for designating a folder in which the first image group is stored, a field for designating the imaging date of the first image group, and a field for designating the imaging location of the first image group are displayed on the screen for designating the first image group. The recipient designates one or more fields to be used for designating the first image group, among the three fields, by checking check boxes provided in the respective fields.

The number of fields for designating the first image group may be 1 or more, and there is no particular upper limit. In a case where two or more check boxes are designated, images matching the designated conditions in two or more check boxes designated by the recipient, in the image group owned by the recipient, may be AND-searched or OR-searched. Whether an image is to be AND-searched or OR-searched may be set in advance, or may be designated by the recipient.

Then, in a case where the "Next" button is pressed, the first image group storage section 102 stores the first image group designated by the recipient.

Then, as shown in FIG. 41, the image display unit 68 of the terminal device 14 of the recipient displays a screen for notifying that the image specifying section 86 automatically selects an image from the first image group designated by the recipient and creates a postcard.

Then, the image analysis section 58 analyzes the contents of each image included in the first composite image group in a case where a "Create Auto Select" button is pressed in the example shown in FIG. 41. Then, based on the analysis result of each image included in the first composite image group, the person specifying section 82 specifies a plurality of persons appearing in each image included in the first composite image group. Then, the image specifying section 86 specifies images, in which a designated person appears, from the first image group stored in the first image group storage section 102 (step S27).

Then, the composite image creation unit 26 creates a second composite image using the images in which the designated person appears (step S28).

Then, as shown in FIG. 42, in a case where the second composite image is created, the composite image creation unit 26 displays a screen for checking the created second composite image on the image display unit 68 of the terminal device 14 of the recipient.

In the case of the example shown in FIG. 42, a candidate for the second composite image to be sent to person A is displayed on the screen for checking the second composite image. A person on the left side appearing in the candidate for the second composite image to be sent to person A is person A, and two persons on the right side are recipients of the photobook. By pressing a "Change Image" button, the recipient can display another candidate for the second composite image to be sent to person A and select another second composite image to be sent to person A. As shown in FIG. 42, it is also possible to combine a text message. As a text message, a fixed sentence selected from a plurality of fixed sentences by the recipient may be displayed. However, the recipient may freely create a text message. By pressing a "Next Person" button, it is possible to display the second composite image to be sent to the next person.

Then, as shown in FIG. 43, the composite image creation unit 26 displays a screen for inputting the address of the person, to whom the second composite image is to be sent, on the image display unit 68 of the terminal device 14 of the recipient.

In the case of the example shown in FIG. 43, the composite image creation unit 26 displays fields for inputting the zip codes and addresses of person A and person B on the screen for inputting an address. The recipient inputs the zip codes and addresses of person A and person B through the instruction input unit 70.

In addition, for example, by swiping up and down a region for inputting an address on the screen for inputting the address, the recipient can display a field for inputting the addresses of other persons, who are not displayed, so that the zip code and the address can be input. In addition, a file of the address book owned by the recipient can be designated by pressing a "Use Existing Address Book (Designate File)" button, and the address of the designated person can be automatically input by designating a person stored in the designated address book. For example, in a case where the recipient of the photobook is a bride and groom, it is possible to use an address book created to send a wedding invitation letter. In this manner, since it is possible to associate the face image and the address with each other through information regarding which person the profile image at the time of creating the first composite image shows and the name of the person stored in the address book, the recipient can easily create a postcard of thanks suitable for each designated person using an image in which each designated person appears, among the images owned by the recipient, and send the postcard to each designated person.

In a case where a "Complete And Send Postcard" button is pressed, the image processing system 10 sends a postcard to person A and person B.

In this manner, in the image processing system 10, a plurality of persons appearing in the first composite image created using a plurality of images owned by a plurality of users can be specified, designation of one or more persons can be received as designated persons among the plurality of specified persons, images in which the designated persons appear can be specified from the first image group owned by the recipient, and the second composite image different from the first composite image can be created using the specified images.

In a case where the first composite image is a photobook of a wedding reception, a plurality of participating users relevant to the creation of the photobook of the wedding reception are included in a plurality of persons participating in the wedding reception. In return for that, the bride and groom, who is the recipient of the photobook, can create a postcard with an image or the like in which each participating user appears, as a second composite image, using images in which each participating user participating in the wedding reception appears, among a plurality of images owned by the bride and groom, by using the image processing system 10 and send the created postcard or the like to each participating user.

Based on the face images of a plurality of participating users relevant to the creation of the first composite image, the plurality of participating users relevant to the creation of the first composite image can be specified as designated persons.

In the following description, it is assumed that the first composite image has a barcode as identification information. In addition, in the case of creating the first composite image, it is assumed that a plurality of face images including the face images of a plurality of participating users acquired from the terminal devices 14 of the plurality of participating users are stored in the face image storage section 100.

In this case, the recipient captures a barcode of the first composite image, for example, by an image capturing unit of a mobile terminal, such as a smartphone owned by the recipient.

The terminal device 14 of the recipient does not need to be a mobile terminal. For example, the barcode of the first composite image can also be captured by an image capturing unit, such as a USB camera with a cable, in the case of the terminal device 14, such as a desktop PC and a notebook PC.

Then, the identification information acquisition section 78 acquires identification information of the first composite image from the capture barcode image.

Instead of capturing the barcode, the recipient may input the identification number described in the first composite image. In this case, the identification information acquisition section 78 acquires the identification number input by the recipient as identification information.

Then, based on the identification information acquired by the identification information acquisition section 78, the face image specifying section 80 specifies face images of a plurality of participating users relevant to the creation of the first composite image among the plurality of face images stored in the face image storage section 100.

Then, based on the face images of the plurality of participating users relevant to the creation of the first composite image, the person specifying section 82 specifies each of a plurality of participating users corresponding to the plurality of persons appearing in the first composite image.

Then, the designated person receiving section 84 specifies participating users corresponding to one or more designated persons among the plurality of participating users relevant to the creation of the first composite image. Thereafter, the designated person operates as a specified participating user as described above.

As described above, the person specifying section 82 can create the second composite image by specifying a plurality of participating users relevant to the creation of the first composite image based not only on the analysis result of the first composite image but also on the face images of the plurality of participating users relevant to the creation of the first composite image.

The recipient can set the importance of the designated person.

In this case, the recipient sets the importance of each designated person, through the instruction input unit 70, on the screen for designating one or more persons as designated persons among a plurality of persons appearing in the first composite image.

Then, the importance information acquisition section 72 acquires the information of the importance of each designated person set by the recipient from the terminal device 14 of the recipient.

Then, based on the importance information, the composite image creation unit 26 creates a second composite image by preferentially using an image in which a designated person having a high importance appears rather than an image in which a designated person having a low importance appears. For example, as compositing target images, the image extraction section 90 extracts images sequentially from an image in which a designated person having the highest importance appears, among a plurality of images in which designated persons appear. Other operations are the same as those described above.

In this manner, it is possible to determine the priority of each image, which is to be used in the second composite image and in which the designated person appears, based on the importance of each designated person and create the second composite image by preferentially using an image in which a person of high importance to the recipient appears.

The recipient can include a comment on the designated person in the second composite image.

In this case, the comment acquisition section 74 displays a screen for inputting a comment on the designated person on the image display unit 68 of the terminal device 14 of the recipient.

The recipient inputs a comment on each designated person through the instruction input unit 70 on the screen for inputting a comment.

Then, the comment acquisition section 74 acquires a comment uploaded from the terminal device 14 of the recipient, that is, a recipient's comment on the designated person.

Then, the composite image creation unit 26 creates the second composite image using the comment acquired by the comment acquisition section 74 in addition to the plurality of images in which the designated person appears.

For example, the image arrangement section 92 arranges a comment on the designated person around the plurality of images in which the designated person appears in the image arrangement region of the main page. Other operations are the same as those described above.

Thus, the recipient can tell his or her feeling to a person to whom the second composite image is to be sent.

The recipient can use an image (still image) and a motion picture in combination.

In this case, the motion picture acquisition section 76 displays a screen for designating one or more motion pictures, for example, on the image display unit 68 of the terminal device 14 of the recipient.

The recipient designates each of one or more motion pictures associated with a plurality of images used in the second composite image, through the instruction input unit 70, on the screen for designating a motion picture.

Then, the motion picture acquisition section 76 acquires the motion picture uploaded from the terminal device 14 of the recipient, that is, each of one or more motion pictures associated with the plurality of images used in the second composite image.

Then, the composite image creation unit 26 creates the second composite image using a first image group which includes one or more images associated with each of one or more motion pictures and in which the designated person appears.

For example, the designated person who is the recipient of the second composite image captures a first image associated with a first motion picture, among one or more motion pictures, in the first image group used in the second composite image, using the image capturing unit of the mobile terminal of the designated person. As a result, the first image captured by the designated person is displayed on the image display unit 68 of the terminal device 14 of the designated person. In this case, by using the augmented reality (AR) technique, the first motion picture is reproduced on the image display unit 68 of the mobile terminal of the designated person.

In this case, the first motion picture may be reproduced on the entire screen of the image display unit 68 of the mobile terminal of the designated person, or may be reproduced within the display region of the first image displayed on the image display unit 68 of the mobile terminal of the designated person.

In this manner, the recipient of the second composite image can reproduce and view the motion picture associated with the image used in the second composite image.

The second composite image may also be created by combining the viewpoints, such as specifying the participating user based on the face image, setting the importance of the designated person, using the comment on the designated person, and using the combination of the image and the motion picture.

As an image associated with the motion picture, a still image extracted from the motion picture may be used. In this case, the image analysis section 58 analyzes the contents of each image included in a plurality of still images forming the motion picture. Then, the person specifying section 82 specifies a plurality of persons appearing in the plurality of still images forming the motion picture based on the analysis result of the plurality of still images forming the motion picture. Then, the image specifying section 86 specifies an image, in which the designated person appears, from the plurality of still images forming the motion picture and sets the specified image as an image associated with the motion picture.

It is not essential for only the secretary user to create a composite image, and a plurality of users involved in the creation of a composite image may create a composite image together with each other, or at least one of a plurality of users may create a composite image.

The specific configuration of each unit of the image processing system 10 is not particularly limited, and it is possible to use various configurations capable of performing the same functions.

In the embodiment described above, the server 12 includes the information setting unit 18, the information management unit 20, the data acquisition unit 22, the data analysis unit 24, and the composite image creation unit 26, at least one of these may be provided in the terminal device 14 of the user.

In the server 12 and the terminal device 14 of the present invention, each component provided in the image processing system 10 may be formed using dedicated hardware, or each component may be formed using a programmed computer.

The method of the present invention can be realized, for example, by a program causing a computer to execute each step of the method. In addition, it is also possible to provide a computer-readable recording medium on which the program is recorded.

While the present invention has been described in detail, the present invention is not limited to the above-described embodiment, and various improvements and modifications may be made without departing from the scope and spirit of the present invention.

EXPLANATION OF REFERENCES

10: image processing system
12: server
14: terminal device (client)
16: network
18: information setting unit
20: information management unit
22: data acquisition unit
24: data analysis unit
26: composite image creation unit
28: budget setting section
30: product item acquisition section
32: cover design setting section
34: writing design setting section
36: schedule setting section
38: setting storage section
40: account information storage section
42: management screen information transmission section
44: upload prompting section
46: image acquisition section 48: evaluation information acquisition section
50: message acquisition section
52: number-of-images calculation section
54: number-of-evaluations calculation section
56: number-of-messages calculation section
58: image analysis section
60: evaluation value calculation section
62: cover creation section
64: main part creation section
66: writing creation section
68: image display unit
70: instruction input unit
72: importance information acquisition section
74: comment acquisition section
76: motion picture acquisition section
78: identification information acquisition section
80: face image specifying section
82: person specifying section
84: designated person receiving section
86: image specifying section
88: image division section
90: image extraction section
92: image arrangement section
94: message division section
96: message arrangement section
98: first composite image acquisition section
100: face image storage section
102: first image group storage section

What is claimed is:

1. An image processing system, comprising:
a processor configured to:
  acquire a first composite image owned by a first user,
  analyze contents of the first composite image,
  specify a plurality of persons appearing in the first composite image based on an analysis result of the first composite image,
  receive designation of one or more persons as designated persons among the plurality of persons appearing in the first composite image,
  store a first image group owned by the first user,
  specify images in which the designated persons appear from the first image group,
  create a second composite image using the images in which the designated persons appear,
  acquire information of an importance of the designated person set by the first user from a terminal device of the first user through the network, and
  based on the information of the importance, create the second composite image by preferentially using an image in which a designated person having a high importance appears rather than an image in which a designated person having a low importance appears.

2. The image processing system according to claim 1, wherein the processor is further configured to:
  acquire a comment of the first user on the designated person from a terminal device of the first user, and
  create the second composite image using the comment in addition to the plurality of images in which the designated persons appear.

3. An image processing method using the image processing system according to claim 1, comprising:
  acquiring a first composite image owned by a first user;
  analyzing contents of the first composite image;
  specifying a plurality of persons appearing in the first composite image based on an analysis result of the first composite image;
  receiving designation of one or more persons as designated persons among the plurality of persons appearing in the first composite image;
  storing a first image group owned by the first user;
  specifying images in which the designated persons appear from the first image group;
  creating a second composite image using the images in which the designated persons appear;
  acquiring information of an importance of the designated person set by the first user from a terminal device of the first user through the network; and
  based on the information of the importance, creating the second composite image by preferentially using an image in which a designated person having a high importance appears rather than an image in which a designated person having a low importance appears.

4. A non-transitory computer-readable recording medium on which a program causing a computer to execute each process of the image processing method according to claim 3 is recorded.

5. An image processing system according to claim 1, comprising:
a processor configured to:
  acquire a first composite image owned by a first user,
  analyze contents of the first composite image,
  specify a plurality of persons appearing in the first composite image based on an analysis result of the first composite image,
  receive designation of one or more persons as designated persons among the plurality of persons appearing in the first composite image,
  storage a first image group owned by the first user,
  specify images in which the designated persons appear from the first image group,
  create a second composite image using the images in which the designated persons appear,
  acquire each of one or more motion pictures, which are associated with a plurality of images used in the second composite image, from a terminal device of the first user, and
  create the second composite image using the first image group which includes one or more images associated with each of the one or more motion pictures and in which the designated persons appear, and
  wherein, in a case where a first image associated with a first motion picture of the one or more motion pictures, in the first image group used in the second composite image, is captured by a camera of a terminal device of the designated person and the captured first image is displayed on a display of the terminal device of the designated person, the first motion picture is reproduced on the display of the terminal device of the designated person.

6. The image processing system according to claim 5, wherein the first motion picture is reproduced within a display region of the first image displayed on the display of the terminal device of the designated person.

7. An image processing method using the image processing system according to claim 5, comprising:
  acquiring a first composite image owned by a first user;
  analyzing contents of the first composite image;
  specifying a plurality of persons appearing in the first composite image based on an analysis result of the first composite image;
  receiving designation of one or more persons as designated persons among the plurality of persons appearing in the first composite image;

storing a first image group owned by the first user;
specifying images in which the designated persons appear from the first image group;
creating a second composite image using the images in which the designated persons appear;
acquiring each of one or more motion pictures, which are associated with a plurality of images used in the second composite image, from a terminal device of the first user;
creating the second composite image using the first image group which includes one or more images associated with each of the one or more motion pictures and in which the designated persons appear; and
reproducing the first motion picture on the display of the terminal device of the designated person, in a case where a first image associated with a first motion picture of the one or more motion pictures, in the first image group used in the second composite image, is captured by a camera of a terminal device of the designated person and the captured first image is displayed on a display of the terminal device of the designated person.

8. A non-transitory computer-readable recording medium on which a program causing a computer to execute each process of the image processing method according to claim 7 is recorded.

9. An image processing system comprising:
a processor configured to:
acquire a first composite image owned by a first user, analyze contents of the first composite image,
specify a plurality of persons appearing in the first composite image based on an analysis result of the first composite image,
receive designation of one or more persons as designated persons among the plurality of persons appearing in the first composite image,
storage a first image group owned by the first user,
specify images in which the designated persons appear from the first image group,
create a second composite image using the images in which the designated persons appear,
acquire a comment of the first user on the designated person from a terminal device of the first user, and
create the second composite image using the comment in addition to the plurality of images in which the designated persons appear.

10. An image processing method using the image processing system according to claim 9, comprising:
acquiring a first composite image owned by a first user; analyzing contents of the first composite image;
specifying a plurality of persons appearing in the first composite image based on an analysis result of the first composite image;
receiving designation of one or more persons as designated persons among the plurality of persons appearing in the first composite image;
storing a first image group owned by the first user;
specifying images in which the designated persons appear from the first image group;
creating a second composite image using the images in which the designated persons appear;
acquiring a comment of the first user on the designated person from a terminal device of the first user; and
creating the second composite image using the comment in addition to the plurality of images in which the designated persons appear.

11. A non-transitory computer-readable recording medium on which a program causing a computer to execute each process of the image processing method according to claim 10 is recorded.

12. An image processing system, comprising:
a processor configured to:
acquire identification information for identifying a first composite image owned by a first user from other images,
in a case of creating the first composite image, acquire a plurality of face images including face images of a plurality of users from terminal devices of the plurality of users through a network and store the plurality of acquired face images,
specify the face images of the plurality of users from the plurality of face images based on the identification information,
store a first image group owned by the first user,
receive designation of one or more persons as designated persons among the plurality of users,
specify images in which the designated persons appear from the first image group, and
create a second composite image using the images in which the designated persons appear.

13. The image processing system according to claim 12, wherein the processor is further configured to:
acquire information of an importance of the designated person set by the first user from a terminal device of the first user through the network, and
based on the information of the importance, create the second composite image by preferentially using an image in which a designated person having a high importance appears rather than an image in which a designated person having a low importance appears.

14. The image processing system according to claim 12, wherein the processor is further configured to:
acquire a comment of the first user on the designated person from a terminal device of the first user, and
create the second composite image using the comment in addition to the plurality of images in which the designated persons appear.

15. The image processing system according to claim 12, wherein the processor is configured to
acquire the first composite image owned by the first user, analyze contents of the first composite image,
specify each of the plurality of users corresponding to the plurality of persons appearing in the first composite image based on the face images of the plurality of users, and
specify users corresponding to the one or more designated persons from the plurality of users.

16. The image processing system according to claim 12, wherein the processor is further configured to:
acquire each of one or more motion pictures, which are associated with a plurality of images used in the second composite image, from a terminal device of the first user, and
create the second composite image using the first image group which includes one or more images associated with each of the one or more motion pictures and in which the designated persons appear, and
wherein in a case where a first image associated with a first motion picture of the one or more motion pictures, in the first image group used in the second composite image, is captured by a camera of a terminal device of the designated person and the captured first image is displayed on a display of the terminal device of the designated person, the first motion picture is reproduced on the display of the terminal device of the designated person.

17. The image processing system according to claim 16, wherein the first motion picture is reproduced within a display region of the first image displayed on the display of the terminal device of the designated person.

18. An image processing method using the image processing system according to claim 12, comprising:
- acquiring identification information for identifying a first composite image owned by a first user from other images;
- in a case of creating the first composite image, acquiring a plurality of face images including face images of a plurality of users from terminal devices of the plurality of users through a network and storing the plurality of acquired face images;
- specifying the face images of the plurality of users from the plurality of face images based on the identification information;
- storing a first image group owned by the first user;
- receiving designation of one or more persons as designated persons among the plurality of users;
- specifying images in which the designated persons appear from the first image group; and
- creating a second composite image using the images in which the designated persons appear.

19. A non-transitory computer-readable recording medium on which a program causing a computer to execute each process of the image processing method according to claim 18 is recorded.

20. The image processing method according to claim 18, further comprising:
- acquiring the first composite image owned by the first user;
- analyzing contents of the first composite image;
- specifying each of the plurality of users corresponding to the plurality of persons appearing in the first composite image based on the face images of the plurality of users; and
- specifying users corresponding to the one or more designated persons from the plurality of users.

* * * * *